US006373522B2

(12) United States Patent
Mathews et al.

(10) Patent No.: US 6,373,522 B2
(45) Date of Patent: *Apr. 16, 2002

(54) ELECTRO-OPTICAL RECONNAISSANCE SYSTEM WITH FORWARD MOTION COMPENSATION

(75) Inventors: Bruce Albert Mathews, Kings Park; Bryan Huntington Coon, Hicksville, both of NY (US)

(73) Assignee: BAE SYSTEMS Information and Electronic Systems Integration Inc., Syosset, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/773,733

(22) Filed: Feb. 2, 2001

Related U.S. Application Data

(63) Continuation of application No. 09/080,452, filed on May 19, 1998, which is a continuation of application No. PCT/US97/19897, filed on Nov. 5, 1997.
(60) Provisional application No. 60/030,089, filed on Nov. 5, 1996.

(51) Int. Cl.[7] ................................................. H04N 7/18
(52) U.S. Cl. ....................... 348/144; 348/144; 348/208; 348/295; 396/130; 396/236
(58) Field of Search ................................. 348/144, 229, 348/314, 441, 275, 208; 396/130, 236; 244/17.19

(56) References Cited

U.S. PATENT DOCUMENTS

| 4,010,319 A | 3/1977 | Levine ........................ 358/213 |
| 4,157,218 A | 6/1979 | Gordon et al. ................ 354/66 |
| 4,242,700 A | * 12/1980 | Weimer ....................... 348/275 |

(List continued on next page.)

FOREIGN PATENT DOCUMENTS

| WO | WO 92/10059 | 6/1992 | ............ H04N/3/15 |
| WO | WO 96/41480 | 12/1996 | ............ H04N/7/18 |
| WO | WO 98/20301 | 5/1998 | ............ G01C/11/02 |

OTHER PUBLICATIONS

Jenkins, Steven J. and J.M. Hilkert, "Line of Sight Stabilization Using Image Motion Compensation," SPIE, vol. 1111, Acquisition, Tracking, and Pointing III, 1989, pp. 98–115.

Kawachi, Donald A., "Image Motion and Its Compensation for the Oblique Frame Camera," Photogrammetric Engineering, vol. XXXI, No. 1, Jan. 1965, pp. 154–165.

(List continued on next page.)

*Primary Examiner*—Chris Kelley
*Assistant Examiner*—Shawn S. An
(74) *Attorney, Agent, or Firm*—Sterne, Kessler, Goldstein & Fox P.L.L.C.

(57) ABSTRACT

An electro-optical framing camera forward motion compensation (FMC) system comprising a moving shutter and a full frame focal plane array detector is disclosed. The reconnaissance system is designed to minimize the variation of image motion from a target scene across the focal plane array. The full frame focal plane array, such as a Charge Coupled Device (CCD), is designed to transfer and add the image from pixel to pixel at a predetermined rate of image motion corresponding to the region exposed by the focal plane shutter. The focal plane shutter aperture and velocity are set to predetermined values coordinated with the available illumination. The CCD image transfer rate is set to minimize the smear effects due to image motion in the region of the scene exposed by the focal plane shutter. This rate is variable with line of sight depression angle, aircraft altitude, and aircraft velocity/altitude ratio. Further, a method of FMC utilizes a comparison of a measured light level to a standard value in order to determine the appropriate exposure time and shutter motion rate. An optimal FMC clocking signal is calculated based on image motion equations incorporated in the processing unit of the reconnaissance system.

4 Claims, 28 Drawing Sheets

U.S. PATENT DOCUMENTS

| | | | |
|---|---|---|---|
| 4,264,930 A | | 4/1981 | White .................... 358/213 |
| 4,382,267 A | | 5/1983 | Angie .................... 358/213 |
| 4,505,550 A | | 3/1985 | Steinbruegge ........... 350/372 |
| 4,505,559 A | | 3/1985 | Prinz ..................... 354/66 |
| 4,664,494 A | | 5/1987 | Hughes et al. .......... 354/234.1 |
| 4,743,971 A | | 5/1988 | Hügli .................... 358/213.26 |
| 4,792,820 A | * | 12/1988 | Norita et al. ............ 396/130 |
| 4,797,746 A | * | 1/1989 | Ashcraft ................. 348/441 |
| 4,855,802 A | | 8/1989 | Narendra et al. ......... 358/103 |
| 4,908,705 A | | 3/1990 | Wight .................... 358/109 |
| 4,926,115 A | | 5/1990 | Tarleton et al. ........... 328/133 |
| 5,155,597 A | | 10/1992 | Lareau et al. ............ 358/213.24 |
| 5,231,502 A | | 7/1993 | Pfister ................... 358/213.11 |
| 5,272,535 A | * | 12/1993 | Elabd .................... 348/314 |
| 5,295,010 A | | 3/1994 | Barnes et al. ............ 359/107 |
| 5,379,065 A | | 1/1995 | Cutts ..................... 348/269 |
| 5,528,592 A | | 6/1996 | Schibler et al. ........... 370/60 |
| 5,528,595 A | | 6/1996 | Walsh et al. ............. 379/93 |
| 5,604,534 A | | 2/1997 | Hedges et al. ............ 348/144 |
| 5,607,122 A | * | 3/1997 | Hicks et al. ............. 244/17.19 |
| 5,668,593 A | | 9/1997 | Lareau et al. ............ 348/146 |
| 5,692,062 A | | 11/1997 | Lareau et al. ............ 328/107 |
| 5,745,808 A | * | 4/1998 | Tintera ................... 348/229 |
| 5,798,519 A | | 8/1998 | Vock et al. .............. 250/206.1 |
| 5,798,786 A | | 8/1998 | Lareau et al. ............ 348/144 |
| 5,844,602 A | * | 12/1998 | Lareau et al. ............ 348/144 |

OTHER PUBLICATIONS

Kostishack, D.F. et al., "Continuous–Scan Charge–Coupled Device (CCD) Sensor System with Moving Target Indicator (MTI) for Satellite Surveillane," Society of Photo–Optical Instrumentation Engineers, Proceedings of the Society of Photo–Optical Instrumentation Engineers, Jul. 31–Aug. 1, 1980, San Diego, California, SPIE, vol. 252, Smart Sensors II, 1980, pp. 44–53.

Valdes, Sergio F., "Image Motion Compensation for Step–Stare Systems by Focal Plane and Optics Manipulator," Society of Photo–Optical Instrumentation Engineers, Proceedings of the Society of Photo–Optical Instrumentation Engineers, Aug. 29–30, 1979, San Diego, California, SPIE, vol. 197, Modern Utilization of Infrared Technology V, 1979, pp. 41–47.

Jensen, Niels, "Optical and Photographic Reconnaissance Systems," John Wiley & Sons, Inc., 1968, pp. 102–124.

Ostrem, Obert and Hughes, John G., "The KS–147A LOROP Camera System," SPIE, vol. 561, Airborne Reconnaissance IX, 1985, pp. 18–25.

* cited by examiner

STRIP MODE

OVERLAP AREA    PUSHBROOM

PANORAMIC

FRAMING

ELECTRO-OPTICAL RECONNAISSANCE SYSTEM WITH FORWARD MOTION COMPENSATION

CROSS REFERENCE TO RELATED APPLICATIONS

This application is a continuation of commonly owned U.S. application No. 09/080,452, filed May 19, 1998, pending, incorporated by reference herein, which is a continuation of the commonly owned, co-pending PCT Appl. No. PCT/US97/19897, filed Nov. 5, 1997 (incorporated by reference herein), which claims the benefit of U.S. Appl. No. 60/030,089, filed Nov. 5, 1996 (incorporated by reference herein).

BACKGROUND OF THE INVENTION

1. Field of the Invention

This invention relates generally to electro-optical reconnaissance systems whose angular resolution is greater than the product of the exposure time and the angular rate of image motion. The invention is a forward motion compensation (FMC) system that permits full resolution performance when the target line-of-sight-angular-rate-exposure-time product is greater than the angular resolution of the system. The system includes optics, a mechanical shutter and full frame CCD.

2. Related Art

Aerial reconnaissance systems have undergone a dramatic transition in the past two decades with the replacement of photographic film by electro-optic image sensors. With the advent of wafer-scale focal planes that provide sufficient coverage and resolution, reconnaissance systems are being designed to utilize electro-optic sensors configured as large format area arrays. These electro-optic ("EO") reconnaissance imaging systems most often employ charge-coupled devices ("CCDs") operating in the visible and near-infrared regions of the electromagnetic spectrum to capture the image of the target or scene. The ability to operate in a real-time environment and in low ambient light conditions are just a few of the reasons why electro-optical-based reconnaissance imaging systems are increasingly replacing film-based reconnaissance systems.

One of the more frequently encountered problems in designing aerial reconnaissance imaging systems is determining the most effective method of compensating for image smear or blurring. Typically, smearing occurs when low ambient light conditions prevent an imaging system from using sufficiently short exposure times, resulting in a blurred image due to the forward motion of the aircraft. In other words, smearing occurs as a result of the relative motion between a scene or target to be imaged and the imaging system. Therefore, in order to prevent the degradation of the information contained in a recorded image, an ideal reconnaissance imaging system must utilize some means of image motion compensation ("IMC") for image smear.

Different reconnaissance mission operating scenarios can present different image motions that should be compensated for. The goal of any image motion compensation system, of which a forward motion compensation ("FMC") system is a specific category, is to reduce the image smear that occurs when the target line-of-sight-angular velocity is significantly different from the camera angular velocity.

Early reconnaissance systems comprised linear arrays that operated at high altitudes, thereby minimizing the angular motion effects proportional to the aircraft velocity/altitude ratio. However, when low flying mission scenarios are required to avoid detection of the reconnaissance aircraft, forward motion compensation is necessary to maintain image resolution. Several conventional methods of IMC have been developed to meet these image resolution requirements.

For example, U.S. Pat. No. 4,505,559, issued Mar. 19, 1985 to Prinz, discloses an approach wherein an instantaneous line-of-sight controls the motion of the film used to record the image. U.S. Pat. No. 4,157,218, issued Jun. 5, 1979 to Gordon et al., also uses a film drive to compensate for the forward motion of the image. Mechanical means are used in U.S. Pat. No. 4,908,705, issued Mar. 13, 1990 to Wight, where the imaging array physically moves to reduce the smear.

U.S. Pat. No. 5,155,597 to Lareau et al., issued Oct. 13, 1992, discloses an equation that described the correction for the image motion in the side oblique scenario by transferring the charge in a column segmented CCD array at different transfer rates corresponding to the depression angle.

However, these aforementioned image motion compensation techniques are inadequate to provide for image motion compensation in each of the various mission scenarios described above. What is needed is an electro-optical reconnaissance system that provides adequate image motion compensation in forward oblique, side oblique, and vertical orientations. In addition, it is desirable that this reconnaissance system be low cost.

SUMMARY OF THE INVENTION

The present invention provides a system and method for the compensation of image motion during reconnaissance missions. According to a first embodiment of the present invention, the electro-optical reconnaissance system includes an imaging focal plane array (FPA), such as a charge-coupled device (CCD), to record a target scene. The focal plane array includes a main format area having a plurality of photo-sensitive cells arranged in rows and columns. The reconnaissance system also includes a shutter having a window (or exposure slit) that moves across the imaging device. In order to compensate for the forward motion of the vehicle, such as an aircraft, the charge in the imaging device is transferred across the device. The rate of charge transfer is uniform across the focal plane array, but varies in time in accordance with the portion of the target being imaged, where the portion of the target scene being imaged is defined by the position and width of the shutter slit. The charge transfer rate is varied based on the position of the shutter slit over the imaging device. A camera control electronics unit controls the position of the shutter slit and processes target scene information, light levels, and reconnaissance mission requirements in order to determine to the rate of motion of objects contained in the portion of the target scene viewed by the focal plane array. As a result, the camera control electronics unit can generate an appropriate clocking signal to perform forward motion compensation (FMC) in a variety of target viewing modes, including forward oblique, side oblique, and vertical modes of operation.

According to a second embodiment of the present invention, a method for providing forward motion compensation for the electro-optical reconnaissance system is utilized in the camera control electronics unit. First, a light sensor measures the light level of the scene to be imaged by the reconnaissance system. Next, the measured light level is compared to a predetermined light level value. For example, the predetermined light level value can correspond to a given solar angle above the horizon. If the measured light value is greater than the standard value, an exposure time is determined by comparing the measured light level to a primary exposure time look-up table. If the measured light value is less than the standard value, the exposure time is determined by comparing the measured light level to a low exposure time look-up table. By determining the proper exposure time, the proper shutter slit width and shutter slit speed are determined. Next, a forward motion compensation profile is determined corresponding to the exposure time and mission parameter inputs. For example, the mission parameters can include aircraft velocity, altitude, and camera look angle. This FMC profile corresponds to the clocking signal that is used to drive the focal plane array of the reconnaissance system in order to perform FMC.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. Overview and Discussion of the Invention

The present invention is directed to a method and system for the compensation of image motion during aircraft reconnaissance missions. In particular an imaging focal plane array (FPA), such as a charge-coupled device (CCD) is utilized to record a target scene. In order to compensate for the forward motion of the aircraft, the charge in the imaging device is transferred across the device. The rate of transfer is uniform across the CCD, but varies in time in accordance with the portion of the target being imaged. This is accomplished by using a moving window (or slit) shutter which scans the projected image of the target across the imaging device. The charge transfer rate is varied based on the position of the projected image on the imaging device. The present invention controls the design and the specification of the optics, mechanical shutter, and the CCD to construct a low cost and producible image motion compensation (IMC) system for a very high performance reconnaissance system. The manner in which this is accomplished is described in detail below.

Figure 1:
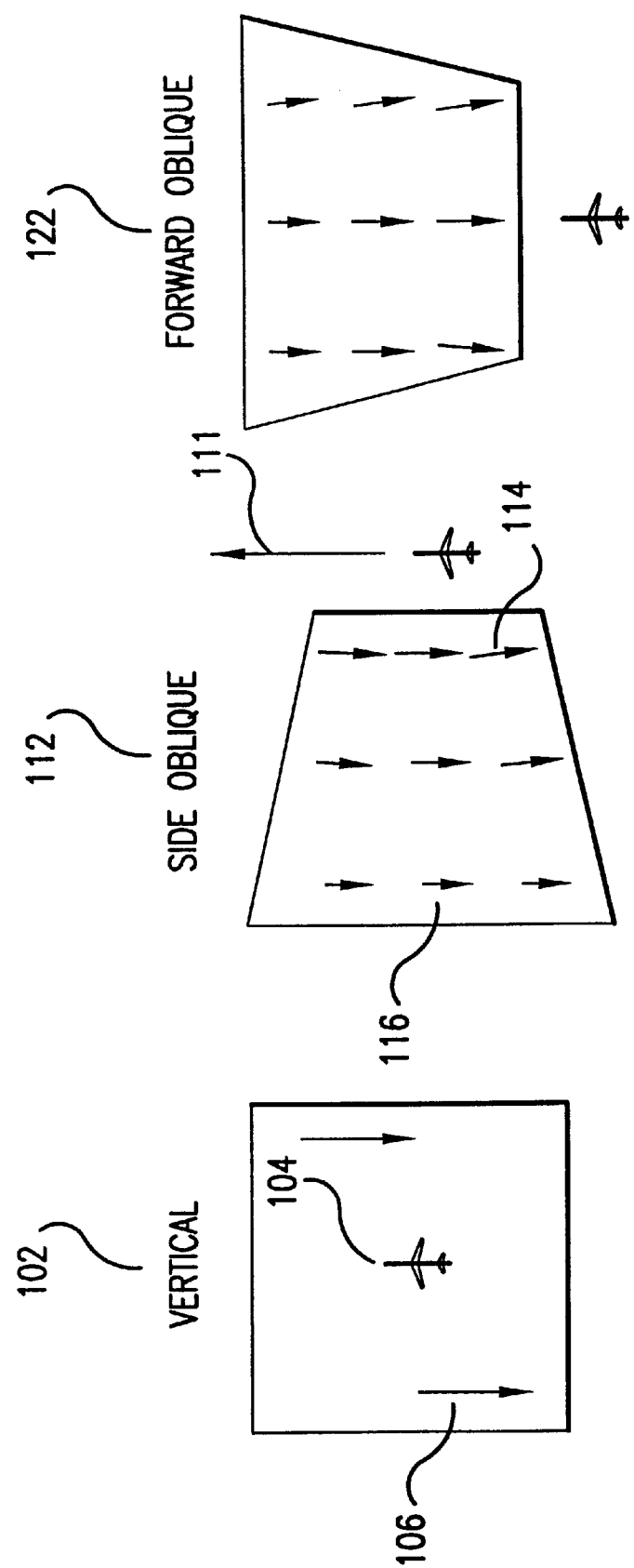
FIG. 1 illustrates various image motions due to the forward motion of an aircraft.

To put the invention in context, a brief discussion of some of the problems associated with current aerial reconnaissance systems will be described. For example, image smear is normally present in several different aerial reconnaissance mission scenarios. FIG. 1 illustrates the types of image motions encountered when the camera is looking directly downward (vertical), looking toward one side (side oblique), and looking forward at a selected angle of depression from the horizon (forward oblique). In FIG. 1, the rectangular focal plane array is shown as projected onto the ground. The relative magnitude and direction of the image motion within the frame is indicated by the length and direction of the motion-indicating arrows.

In the vertical example 102, the aircraft 104 flies directly over top of the target or scene of interest. Thus, all of the image motion is of a singular direction (opposite to the flight direction) and magnitude. That is, all the parts of the image move together, parallel to the line of flight. This motion is uniform in magnitude throughout the frame 106.

In the side oblique case 112, the motion remains parallel to the line of flight 111, but is not of the same magnitude throughout the frame. Objects nearest to the flight path, represented by arrow 114, appear to move fastest. Those objects further away from the line of flight, represented by arrow 116, appear to move more slowly, in proportion to their distance from the flight path 111.

The forward oblique case 122 is more complex. In this case, the image motion is composed of two vectors. The first is parallel to the line of flight as in the examples discussed above. Here again, the magnitude of this motion vector varies with range from the aircraft: the motion vector is larger the nearer a given point in the image is to the aircraft. Away from the line of flight, a second motion (of much lower absolute magnitude) occurs. As points approach the aircraft, they appear to "fly off" to the side of the format. Points to the left of the flight path "fly off" to the left, and points to the right of the flight path "fly off" to the right. The magnitude of this vector increases the closer a given point is to the aircraft.

2. Example Environment

Before describing the invention in detail, it is useful to discuss example reconnaissance techniques in which the invention can be utilized. Preferably, the present invention can be implemented in a variety of electro optical reconnaissance systems. For example, four basic types of imagery sensors are: strip mode, pushbroom, panoramic sector scan and framing. The choice of a particular technique depends on the specific operational need. These four example reconnaissance systems are illustrated in FIG. 2.

Figure 2A:
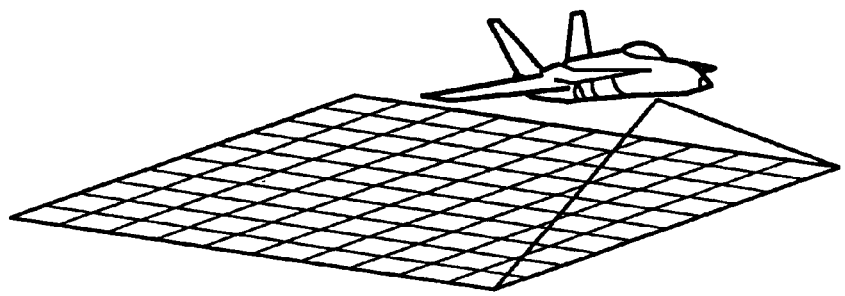
FIGS. 2A–D illustrate alternative conventional electro-optical imaging modes.

FIG. 2A illustrates a stip mode sensor. Strip mode sensors create an image by pointing an EO (electro-optical) focal plane at the ground, through a lens, orientated perpendicular to the line of flight. The EO focal plane device can be a body-fixed sensor or a moveable sensor. Ground geometry is maintained and/or corrected by adjusting the line rate of the focal plane to compensate for image motion. For example, as shown in FIG. 2A, a linear detector array (not shown), located in aircraft 202 is oriented perpendicular to the flight direction. The array comprises a line of pixels to create a first dimension of scene coverage. The forward motion of the aircraft creates a second dimension of coverage along the flight path of the aircraft.

Figure 2B:
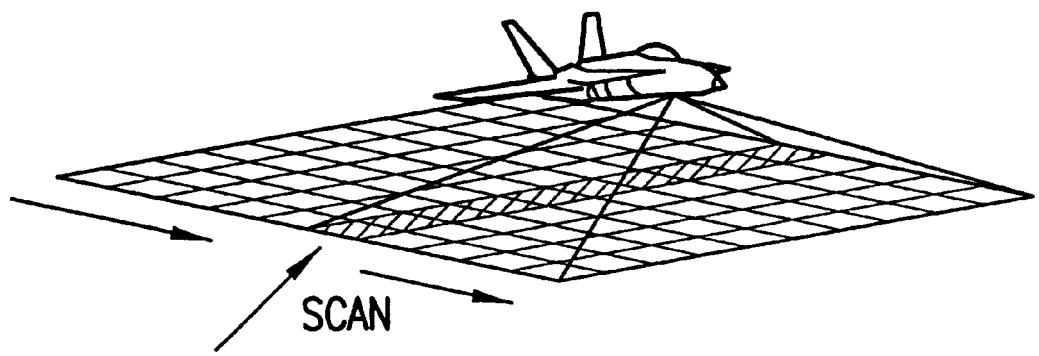

A second reconnaissance technique is called a "pushbroom" technique and is illustrated in FIG. 2B. Pushbroom sensors are a variation of strip mode sensors, in which the linear instantaneous field of view is moved fore and aft in the in-track or along-track (along the flight path) direction in order to achieve stereo imaging, compensate for image motion, and/or create an image "frame." Once again, as shown in FIG. 2B, a linear array is oriented perpendicular to the flight direction. The combination of the forward motion of the aircraft and the fore/aft scan of the array produces an overlapping second dimension of coverage.

Figure 2C:
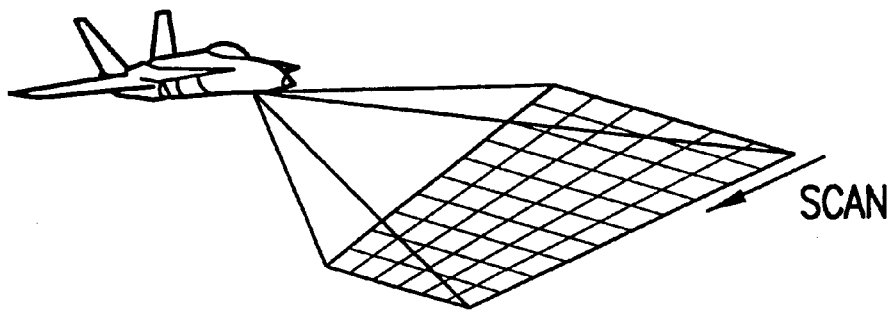

A panoramic sector scan sensor technique, illustrated in FIG. 2C, creates a "frame" of imagery by moving the instantaneous field of view of the focal plane perpendicular (or across-track) to the line of flight. The width of the frame (in degrees) is fixed by the focal length of the sensor and the length of the focal plane, and the across-track coverage is determined by the scan speed and the duration of the scan of the sensor. In this example, a linear detector array is oriented parallel to the flight direction. The scan of the array, e.g., from the horizon down, produces the second dimension of coverage.

Figure 2D:
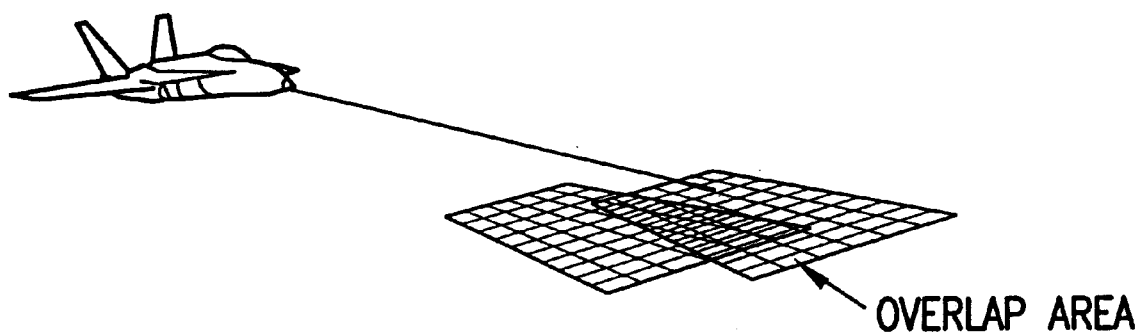

A fourth technique, known as a framing sensor technique, is illustrated in FIG. 2D. Framing sensors "instantaneously" collect area images, much as a snapshot camera does. For example, an area detector array is pointed to a target, then frames of imagery are collected. Up until recently, frame size and resolution were limited, due to the size and fewer number of pixels in staring arrays.

Framing sensors are advantageous for specific applications. For example, a framing sensor is uniquely able to capture forward oblique imagery containing the horizon. This capability can give the reconnaissance pilot flexibility when maneuvering the aircraft near the target. In addition, a framing camera can provide improvements in low light level performance, continuous stereo coverage and reduced image artifacts resulting from low frequency motions.

Until recently, EO framing cameras were not operationally viable due to their small image area and technology limitations associated with data processing and storage. Improvements in wafer fabrication and image processing technologies now make this type of camera feasible. As described below, such high resolution framing cameras can compliment other tactical reconnaissance sensors, especially in the forward oblique mode and for stereo imaging.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

3. Electronic Forward Motion Compensation (FMC)

The use of Charge Coupled Devices (CCDs) in place of film allows for a method of "electronic" image motion compensation. In this method, the electronic signal being formed in the detector array by the image can be shifted to move along with the motion of the image falling on the array. This charge transfer concept is illustrated schematically in FIG. 3. This method can be used to reduce smear caused by the image motion while allowing for longer exposure times.

Figure 3:
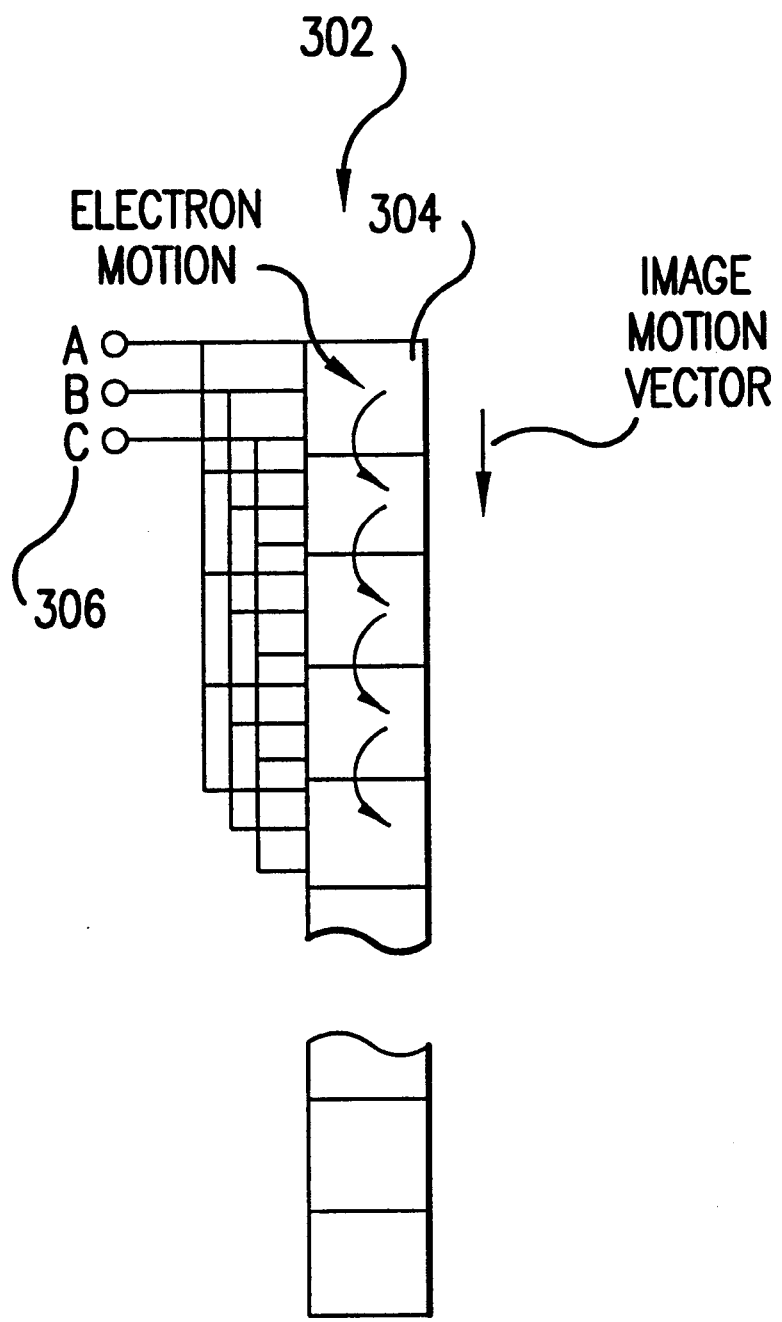
FIG. 3 illustrates the shifting of charges in a simplified Charge Coupled Device (CCD)

FIG. 3 shows a simplified CCD detector represented as a single column of pixels 302. The incident light on each pixel (or potential well), for example pixel 304, generates free electrons which are collected at the pixel site. By the application of clocking waveforms A, B, and C at input 306, the charges (electrons) collected in a pixel well are shifted down the column. If all pixels are clocked together, a "bucket brigade" like transfer of the signals is achieved. According to the present invention, the pixels are clocked during the exposure period at a rate equal to the rate of image motion. Thus, the signal generated by a specific image point will move to stay with that image point. This method of charge transfer eliminates smear due to the image motion while increasing the effective exposure time.

There are at least three methods of compensating for image motion which are electronic in nature; average FMC, graded FMC and segmented FMC. All of these methods of FMC can be utilized in the present invention. These methods are each described below. Additionally, these methods are contrasted with an uncompensated imager.

a. No FMC

Figure 4:
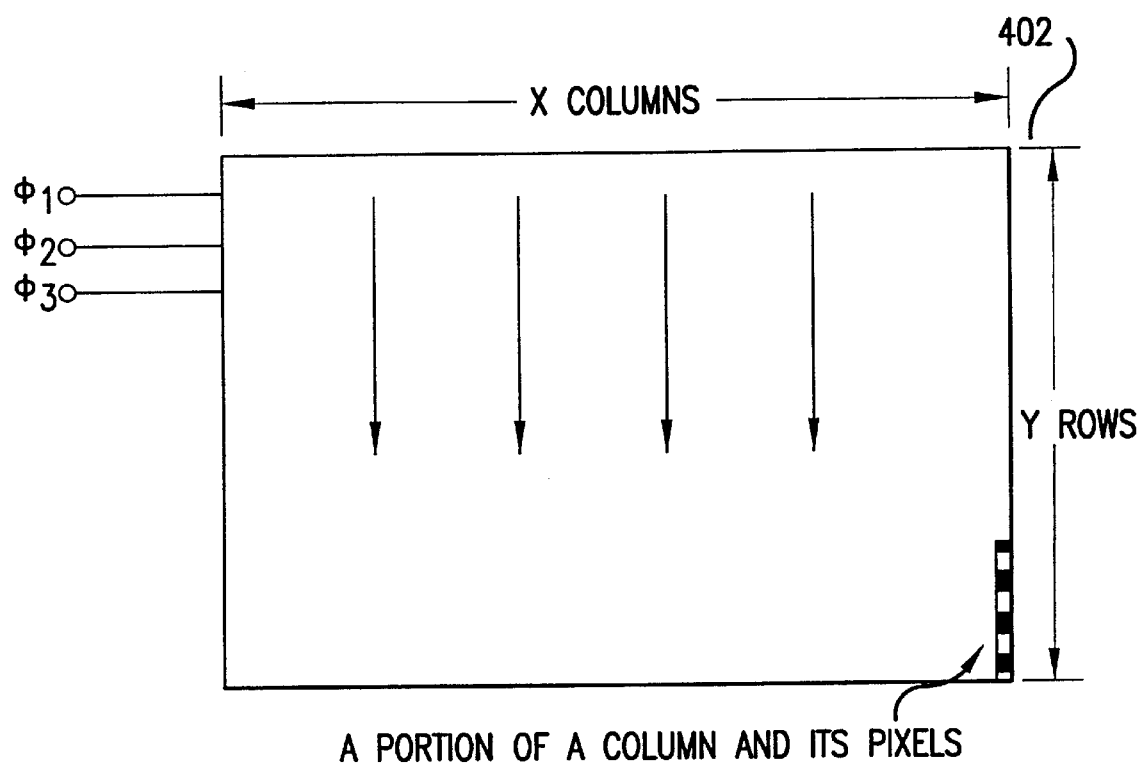
FIG. 4 illustrates a conventional detector array.

FIG. 4 illustrates an uncompensated imager. The uncompensated imager is a simple, but very large imager comprising rows and columns of pixels, as well as attendant readout structure (e.g., amplifiers, etc.). In the uncompensated imager no attempt is made to eliminate or minimize the image-smearing effects of image motion. The film camera used with an uncompensated imager is typically one in which the film is flat and fixed, and the shutter (between-the-lens or focal plane) is simply opened to produce the desired length of exposure. Whatever image motions occur during exposure, together with the associated smear-induced loss of image quality, are simply tolerated.

For example, a detector array 402 based on an uncompensated imager includes X columns, each of which has Y pixels. The array is exposed to a moving image and the signal is then shifted out as in a CCD or read by the application of an X and Y address clock. Image smear causes a loss of image quality as a function of its magnitude.

b. Average FMC

An improvement over the uncompensated imager configuration is an average FMC imager. In average FMC imagers, as charge is collected during exposure, the charge is also moved in synchronization with the motion of the image which produced it. For example, the IMMIC (Integrating Mode Moving Image Chip) is a known average FMC imager.

An average FMC imager can also be described with respect to FIG. 4. The detector array 402 comprises X columns, all of which transfer charge at the same rate. Each column comprises Y pixels. During an exposure, all charges can be moved at a rate equal to the average motion rate. A detector array based on average FMC has one set of clock lines ($\phi_1$, $\phi_2$, $\phi_3$) which transfer charge for the entire array at a rate proportional to clock speed.

Also referred to as Time Delay and Integration (TDI), the average FMC method is used to increase the signal-to-noise ratio. Such charge motion can be implemented using a variant of the simple large chip discussed above by shifting data along the CCD columns while the shutter is open. The image motion rate for all columns is the same. The image motion rate is selected by a camera system housing the average FMC imager to match the average image velocity over the chip during exposure. While average FMC imagers provide average EMC correction, they do not compensate for the different magnitudes of the image vectors at different distances from the flight path. Therefore, unless the image motions are uniform, even with a perfect match to the desired average charge/image velocity, certain columns would exhibit lead or lag smear errors. Even though these errors are much less than for the uncompensated imager, these errors result in less than optimum performance. In average FMC, either a between-the-lens or focal plane shutter can be used.

c. Graded FMC

As discussed above, in either side oblique or forward oblique imaging applications, forward image motions are not the same at all positions in the field of view (FOV). In order to solve the problem of non-uniform image motion as a function of position of the object being imaged, it is necessary to alter the charge motion rate for each column (or group of columns). The present invention is based on graded FMC. Graded FMC imagers use a combination of a time varying charge motion rate and an exposure controlled by a focal plane shutter slit. With graded FMC imagers, the charge motion rate is uniform across the columns of the array, but it varies in time as a function of the portion of the imager being exposed by the slit at a given instant.

Figure 5:
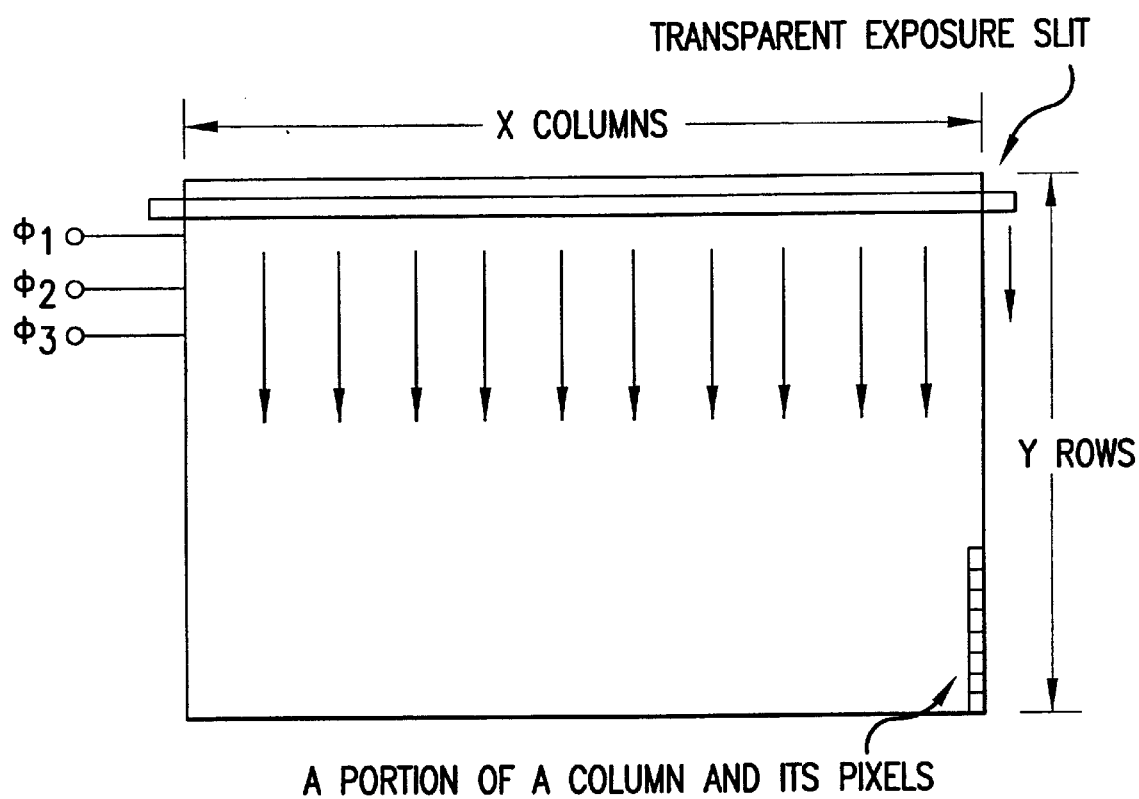
FIG. 5 illustrates a detector array employing graded forward motion compensation (FMC) according to the present invention (shown in the forward oblique mode)

This graded FMC approach utilizes a focal plane shutter so that only a portion of the array is exposed at any one time. Thus, the invention matches the charge motion rate with the position of the shutter slit as it traverses the chip. As a result, the optimum charge motion rate can be selected corresponding to the exposed portion of the array. Because only one area is exposed during the time associated with a given charge transfer rate, a nominally ideal image motion compensation can be obtained on-chip. Concerning focal plane array chip design, graded FMC imagers are similar to average FMC imagers. However, a reconnaissance system based on graded FMC imagers, utilizes the added refinements of a focal plane shutter and column clocks synchronized to the changes in image motion. For example, FIG. 5 illustrates the graded FMC concept used in the forward oblique imaging mode.

A detector array utilizing graded FMC has one set of clock lines which transfer charge for the entire array at a rate proportional to clock speed. The array is made up of X columns, all of which transfer charge at the same rate. Each column is made up of a number of pixels. Pixel signal is shifted along all columns keeping pace with the rate of image motion seen through the slit. Thus, according to the present invention, the moving exposure-slit is used to determine the exposure time for any portion of the array, and to allow tracking of variable image motion across the array.

d. Segmented FMC

Figure 6:
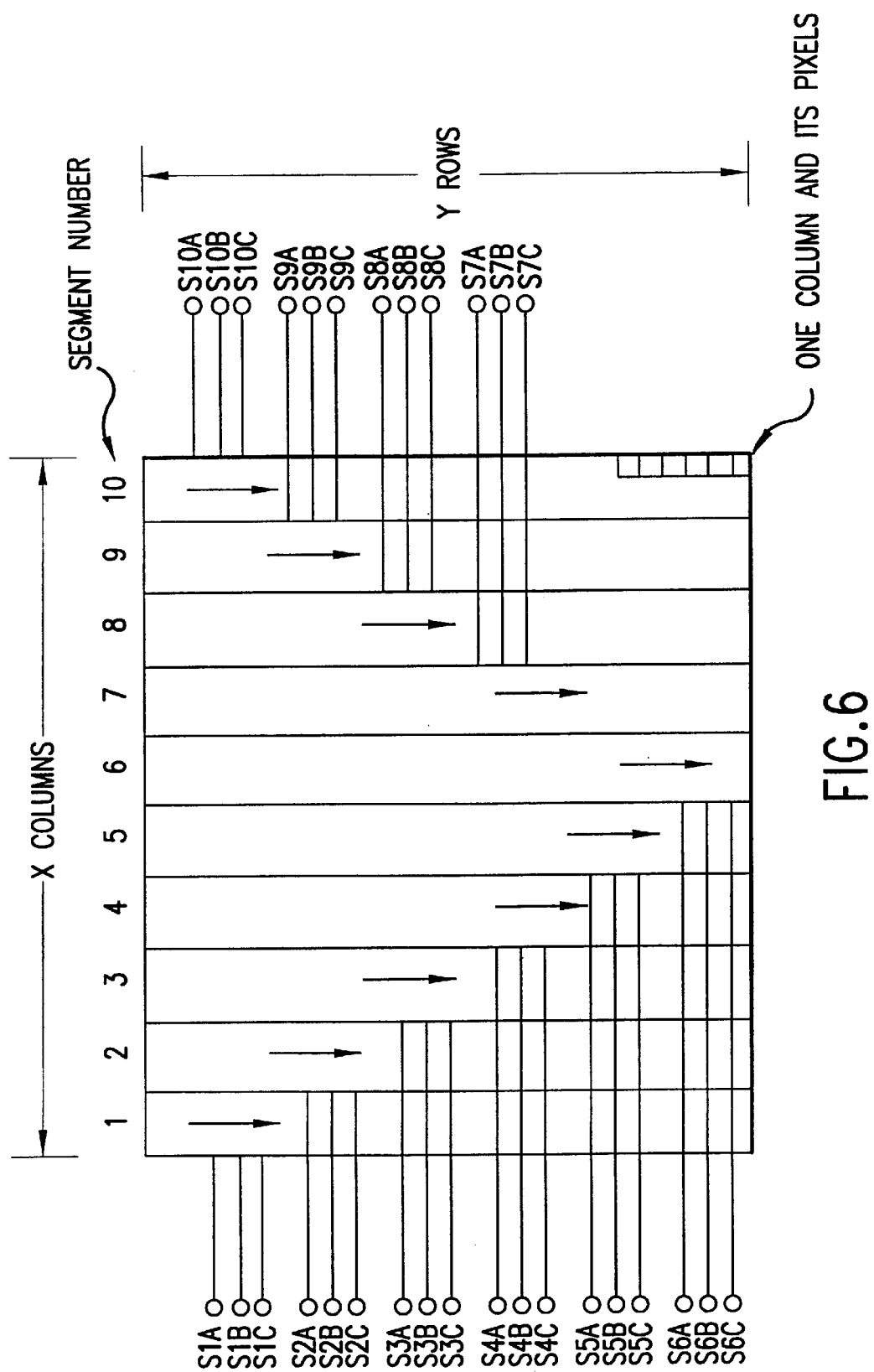
FIG. 6 illustrates a conventional detector array employing column-segmented forward motion compensation.

A fourth category of detector chip, referred to as segmented FMC, can be designed to work with either a between-the-lens shutter or a focal plane shutter camera. The segmented FMC concept is shown in FIG. 6. Here the area of the imager is broken up into some number of segments, where each segment is a group of columns. The size of the segments will be dictated by the magnitude of the differential motion from "side" to "side" of the array and the practicality of adding ever more segments. The average FMC and graded FMC systems represent an example of a single segment. For example, a segmented FMC imager having 16-segments requires 16-times the drives/clocks, etc. of a graded FMC device.

The column segmented detector array is segmented into sections. Each section is clocked to move charge at a different rate in order to keep pace with differing image rates. Each segment is made up of a number of columns, all of which transfer charge at the same rate. Each column is made up of a number of pixels.

For example, an array which can be implemented in conjunction with the segmented FMC is disclosed in the Lareau '597 patent, incorporated herein by reference.

According to the present invention, a graded FMC detector array is incorporated into an electro-optical reconnaissance system. Further, the reconnaissance system utilizes a moving shutter or slit to perform image motion compensation in the vertical, forward oblique, and side oblique modes of operation. Using a graded FMC imager approach reduces the potential complexity to the design and cost of the focal plane array. Alternatively, the present invention can be implemented using a column-segmented focal plane array. The manner in which these FMC imagers operate is described in detail below.

4. Side Oblique Operation in Detail

Image motions and operations of the graded FMC imager according to the present invention are described in detail for the side oblique mode of operation. In the side oblique image collection mode, compensation of the image motion is complex. Although image motion remains monotonic in direction, the magnitude of the image motion is a function of the position of a given column of pixels in the focal plane array (FPA) relative to its position within the format.

Figure 7:
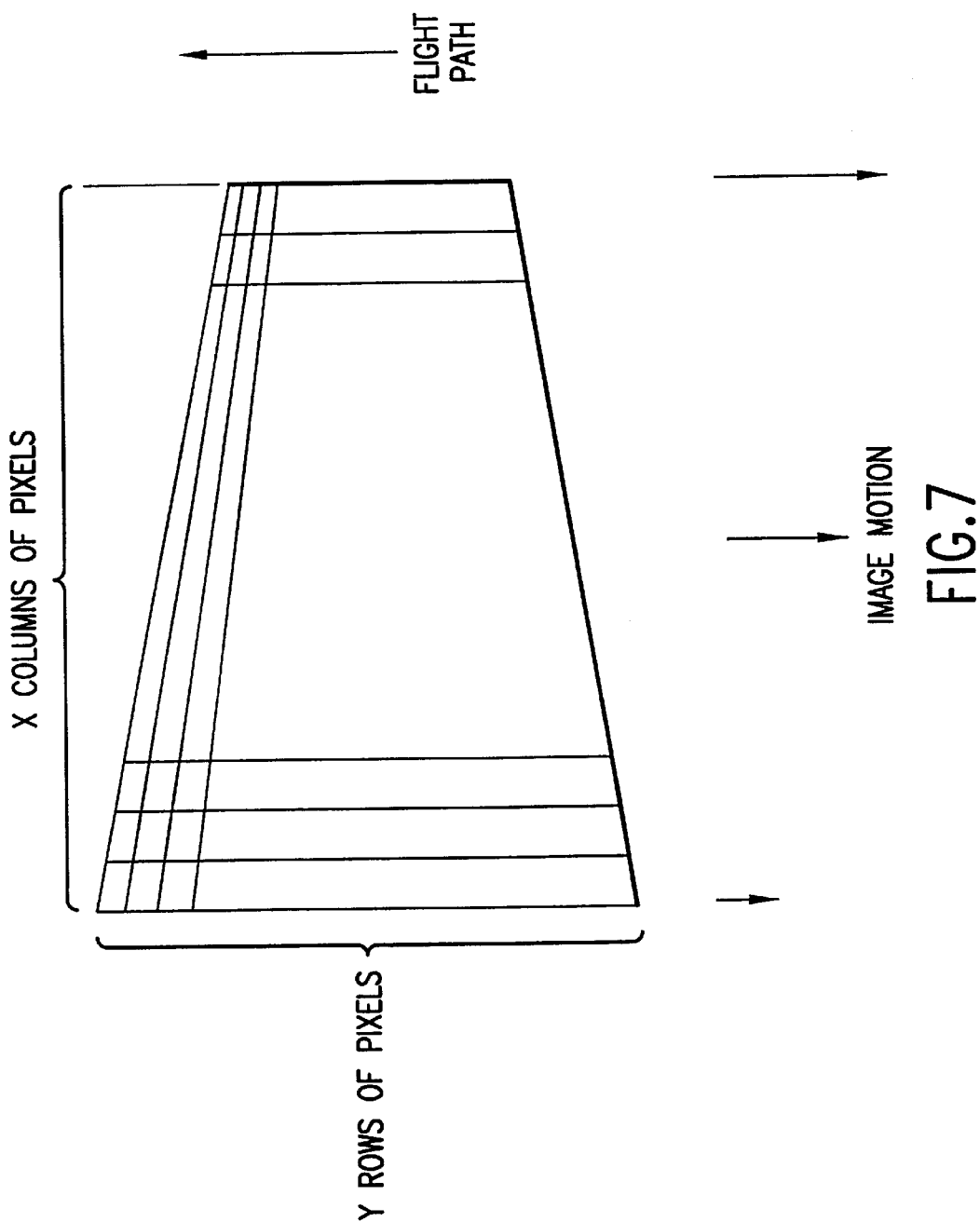
FIG. 7 illustrates a projection of a focal plane array onto the ground for side oblique image collection.

The projection of the FPA onto the ground in a side oblique mode of operation is illustrated in FIG. 7. The further away the projection of a particular column of pixels is from the flight track, the more slowly the scene image traverses it. To correct for this unidirectional, but unequal, image motion throughout the format, alternative means to transfer the charges along each column can be implemented.

For example, one method of achieving FMC is to divide the columns into sub-groups of a few columns each and to transfer charges along each sub-group at some average rate deemed to be sufficiently approximate for that sub-group. This column-segmented FMC method is described above. Each sub-group requires a separate set of adjustable clocks. Such a set of clocks is calculated to work at the best compromise for a given V/H and depression angle combination. In addition to adding greatly to the complexity of the chip drive electronics, the added complexity of the detector chip makes it difficult, expensive, and risky to produce. These same factors tend to limit the ultimate size (i.e., pixel count) of a column-segmented imaging device.

An alternative approach, according to a preferred embodiment of the present invention, is to combine the charge motion handling technique described above with the incorporation of a focal plane shutter within the camera. This combination achieves graded FMC.

For example, recall the FPA projection illustrated in FIG. 7. According to the present invention, a focal plane shutter having an exposure slit which runs parallel to the columns of CCD pixels is added to the arrangement. This shutter traverses the array from left to right, sequentially exposing different columns of pixels to the target scene.

Figure 8:
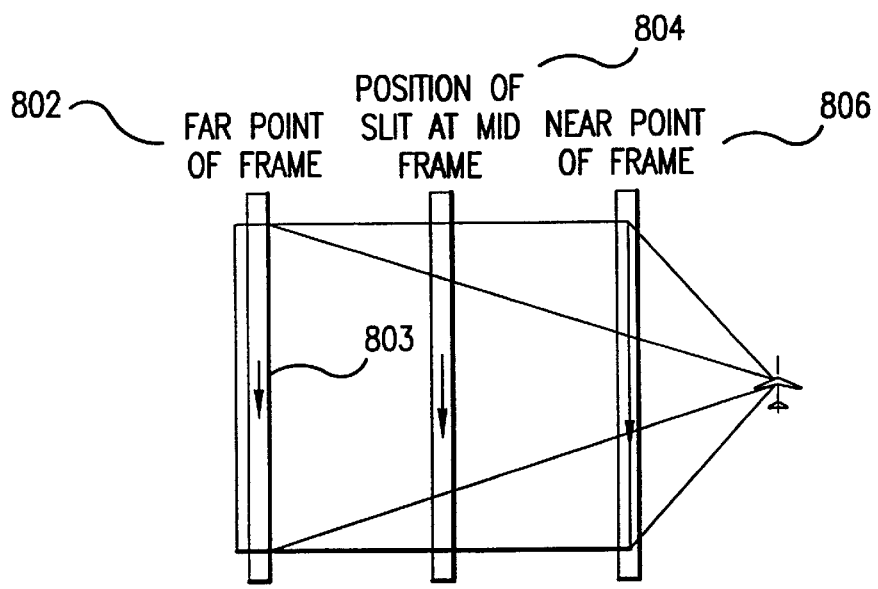
FIG. 8 illustrates the operation of a graded FMC detector array operating in a side oblique viewing mode.
Figure 9A:
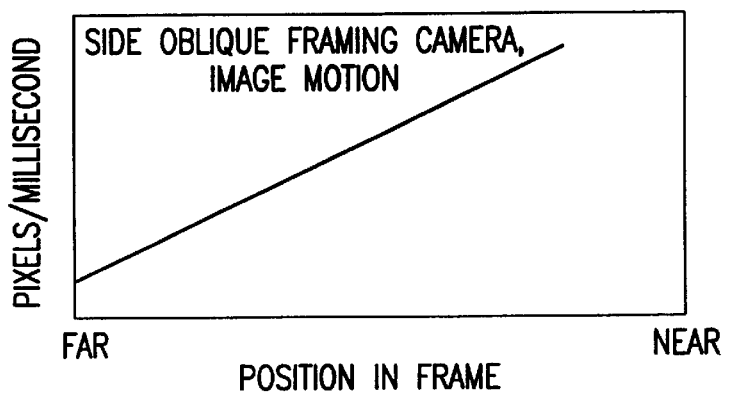
FIG. 9A illustrates the image motion rate and FIG. 9B illustrates the CCD line rate for a graded FMC detector array operating in a side oblique viewing mode.

The operation of a FPA with graded FMC is illustrated in FIG. 8. For example, at the far point of the frame 802, the magnitude of the image motion is at its smallest, as illustrated by arrow 803. At the mid frame point 804, the magnitude of the image motion has increased. At the near point of the frame 806, the magnitude of the image motion is at its greatest, as this corresponds to the objects closest to the aircraft. The rate at which charge is swept down the columns is varied uniformly in magnitude across the entire FPA. Without a focal plane shutter in place, this charge motion rate might be correct for one column or small group of columns, but would be incorrect for all other column groups. However, by making the charge transfer rate (for the entire FPA) consistent at any one instant but variable with the position of the exposure slit in the focal plane shutter, the charge transfer rate is varied such that the charge transfer rate is matched to the image motion rate in that particular column in the center of the exposure slit. This principle is illustrated in FIG. 9A, which shows how the image motion rates vary as a function of distance. Thus, only the image rate corresponding to the position of the slit is "seen" by the array at any given time.

Figure 9B:
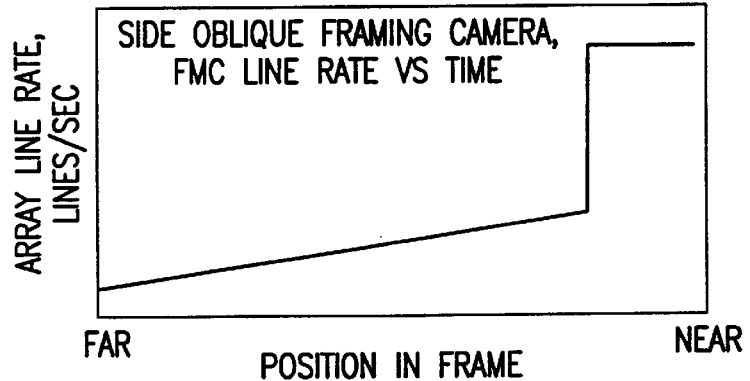

The CCD line rate is made to vary as a function of slit position to match the image motion rate, as shown in FIG. 9B. At the conclusion of slit travel, the complete array is read out at a maximum rate. The charge motion in the unexposed areas is not matched to the correct image motion rate, but this is of no consequence since no imaging light is being collected outside of the exposure slit area. As illustrated in FIG. 8, for side oblique operation, the focal plane shutter (or slit) is oriented parallel to the charge transfer columns and is moved perpendicular to the image motions.

In the side oblique mode of operation, the graded FMC imager approach provides FMC without the added design and charge transfer complexities of the segmented FMC approach. In particular, these risks are significantly reduced for large scale FPAs, such as a 9216 pixel by 9216 pixel CCD.

Figure 10:
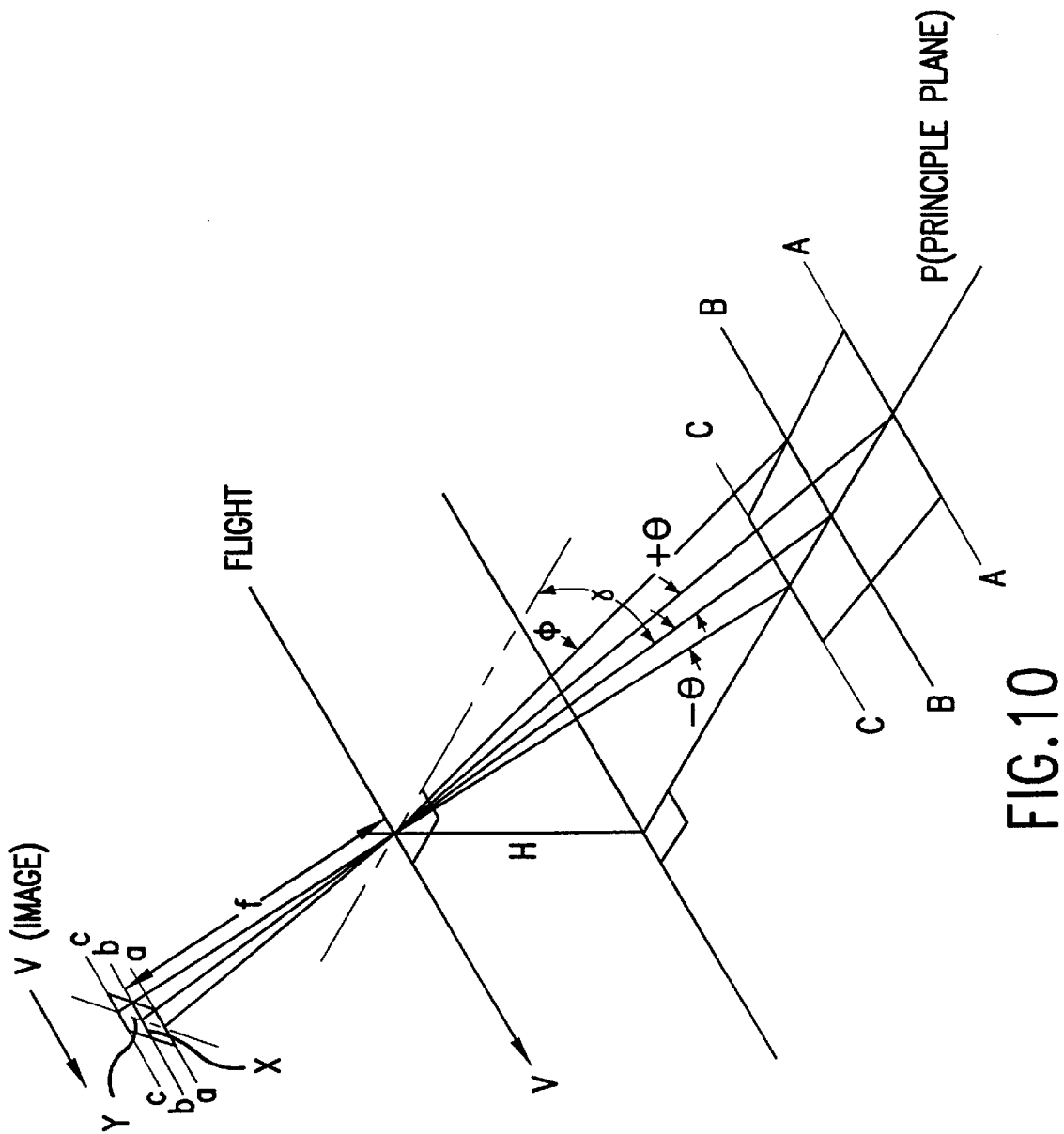
FIG. 10 is an illustration of an example environment for the electro-optical reconnaissance system operating in a side oblique viewing mode.

To understand the rate at which charge is transferred in order to perform FMC, it is beneficial to examine the geometry of the focal plane array and the target. FIG. 10 illustrates the side oblique geometry. In this geometry:

F=Focal length
H=Altitude (ALT)
V=Aircraft velocity
φ=in track angle
θ=cross track angle
γ=depression angle The position at which a point of the target is focused on the focal plane (i.e., the CCD) as a result of the lens is, given by the Rectilinear Lens Image Transfer Relation. In the side oblique mode, the derivative of the image transfer relation determines the motion in the x-direction (i.e., $V_{CCD}$ in the x-direction). For an ideal lens, the image transfer relation is:

$$x = F(\tan \phi)$$

Note that for non-ideal lenses, this transfer relation changes, depending on the imperfections in the lens (i.e., $x = F(\tan \phi + k_1 \phi^3 + k_2 \phi^5)$).

The point where φ=0 indicates the center of the area of the target "seen" by the lens. Values of φ other than zero indicate a point on the target separated from the center point in the in-track direction by that angle.

The rate of change of distance x across the focal plane with respect to the in-track motion is given by:

$$\frac{dx}{d\phi} = \frac{F}{\cos^2 \phi}$$

The rate of change in the in-track direction as a function of time is dictated by the target geometry and shown by the relationship:

$$\frac{d\phi}{dt} = \frac{V \cos\phi}{\frac{H}{\sin\gamma \cos\phi}} = \frac{V}{H} \sin\gamma \cos^2\phi$$

The rate of motion of a point of the target across the CCD (dx/dt) is the product of the motion across the focal plane and the change in the in-track direction. The charge transfer velocity is always in track (along the direction of flight). Thus the charge transfer velocity, $V_{CCD}$, (in-track, i.e., perpendicular to the principle plane or along line B from FIG. 10) is determined by:

$$V_{CCD} = \frac{dx}{dt} = \frac{dx}{d\phi} \cdot \frac{d\phi}{dt} = \frac{VF}{H} \frac{\sin\gamma \cos^2\phi}{\cos^2\phi} = \frac{VF}{H} \sin\gamma$$

Thus, $V_{CCD}$ is independent of φ when θ=0.

In order to determine the charge transfer velocity variation along the principle plane, the tangential effects must be examined instead of image transfer effects. The effective focal length is given by:

$$F_{EFF} = \frac{F}{\cos\theta}$$

The change in position on the image sensor as a function of the change in the cross-track direction is given by:

$$\frac{dx}{d\phi} = \frac{F}{\cos\theta}$$

Similar to the case with the in-track direction (i.e., along line B), the velocity $V_{CCD}$ of the image along line P (of FIG. 10) is given by:

$$V_{CCD} = \frac{dx}{dt} = \frac{dx}{d\phi} \cdot \frac{d\phi}{dt} = \frac{F}{\cos\theta} \cdot \frac{V}{H}\sin(\gamma \pm \theta)$$
$$= \frac{FV}{H}\sin\frac{(\gamma \pm \theta)}{\cos\theta}$$

Where:

$$\frac{d\phi}{dt} = \frac{V}{\frac{H}{\sin(\gamma \pm \theta)}}$$

These equations describe the image motions that are compensated for imaging in the side oblique mode of operation. These equations can be used to form a look-up table that is utilized in the camera control processing system described below in Section 7(b)(i).

5. Forward Oblique Operation in Detail

Image motions and operations of the example FMC methods are now described in detail for forward oblique look angles. According to the present invention, forward oblique motions are compensated by using a focal plane shutter for a graded FMC imager. The advantages in using the graded FMC approach are described below by way of a comparison to the previously discussed FMC approaches.

Figure 11:
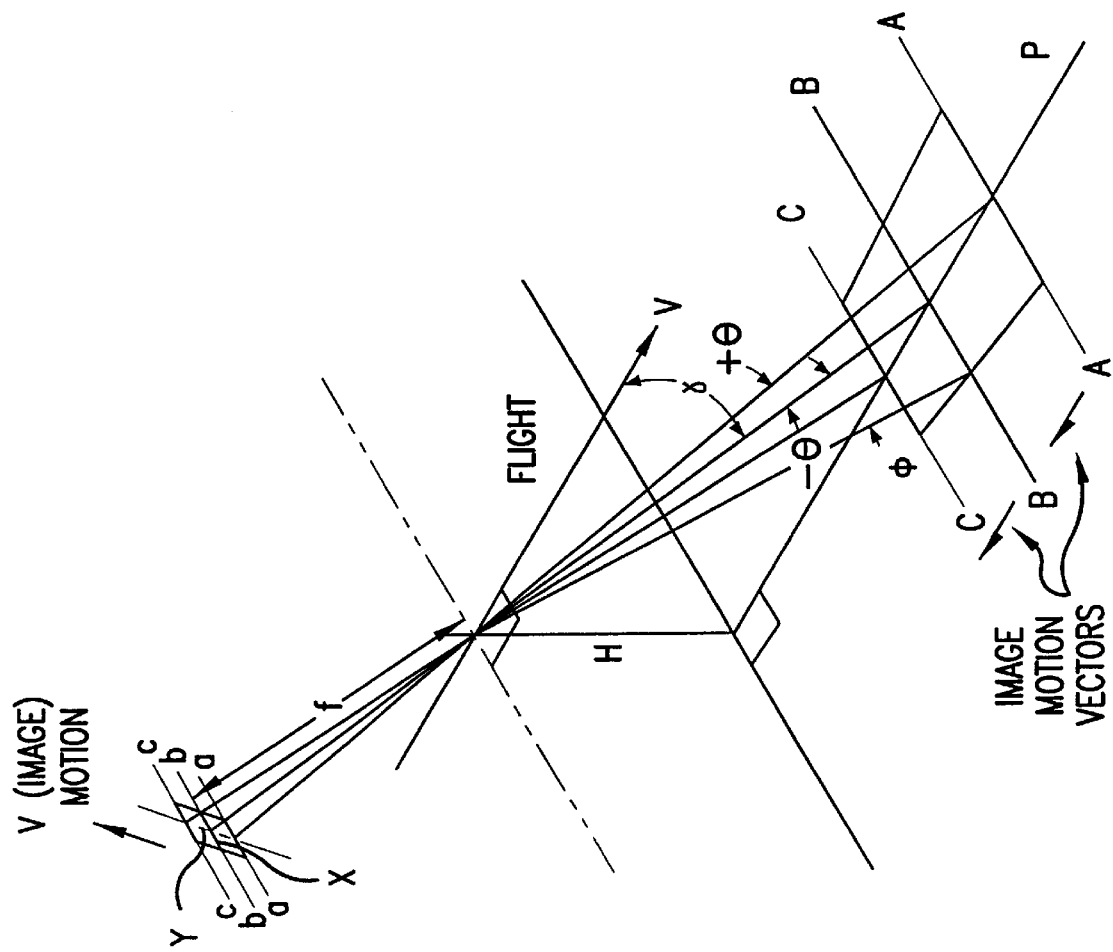
FIG. 11 is an illustration of an example environment for the electro-optical reconnaissance system operating in a forward oblique viewing mode.

The forward oblique geometry is illustrated schematically in FIG. 11. In the forward oblique mode of image collection, the center line of the FPA is aligned to the direction of flight just as in the vertical case. Now, however, the optical axis of the camera is pointed upward from Nadir (i.e., the point directly below the aircraft).

Figure 12:
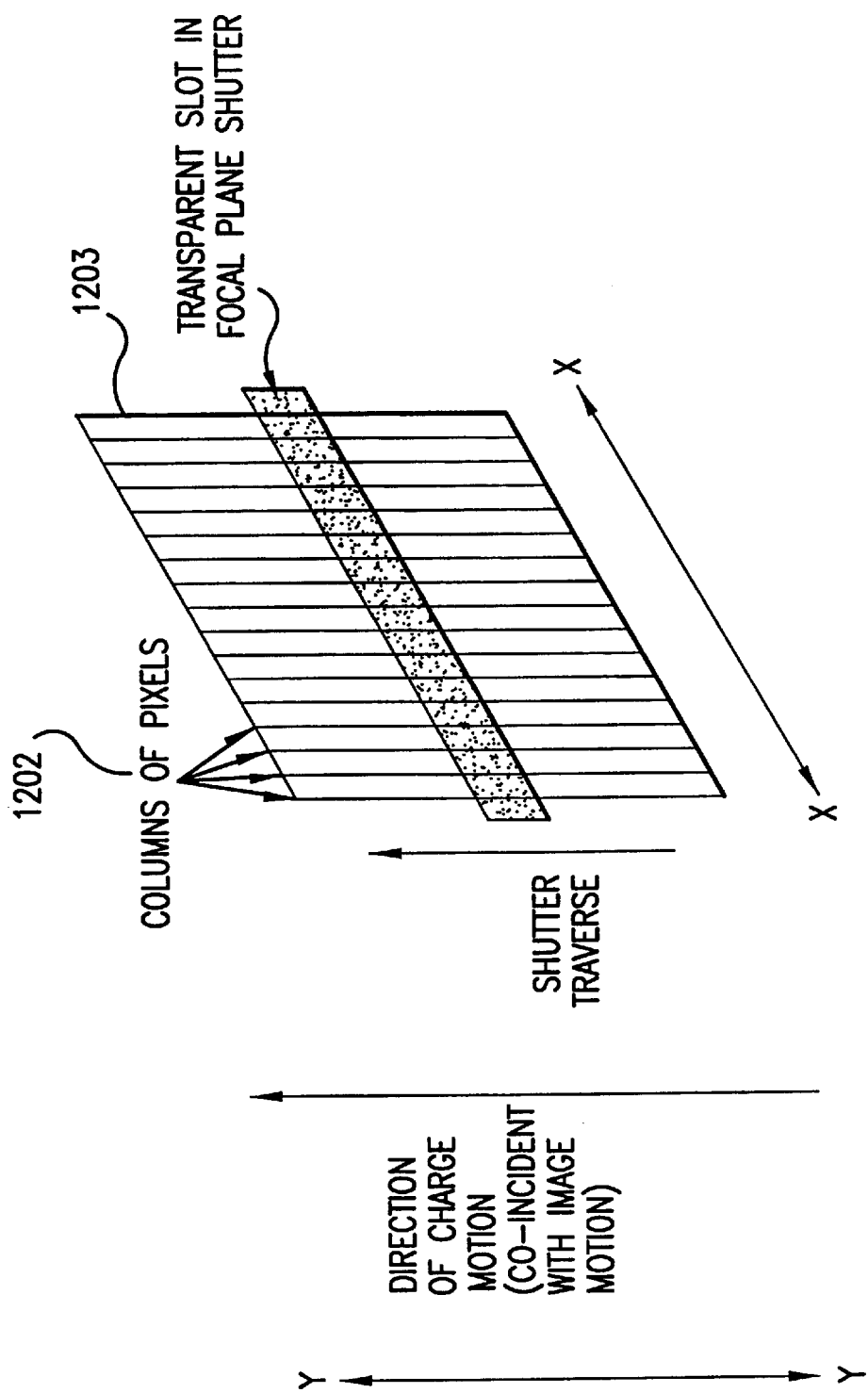
FIGS. 12 and 13 illustrate the operation of a graded FMC detector array in a forward oblique mode according to the present invention.

For a FPA operating in the forward oblique mode, as shown in FIG. 12, the columns of pixels 1202 run from the "top" to the "bottom" of the FPA 1203. The magnitude of charge motion in the forward oblique orientation varies with position along the Y—Y axis of FIG. 12. All columns share a common value for image and charge velocities for any given point along the Y—Y axis, whereas all column velocities are common along the X—X axis.

The variation in apparent in-track (along a column) image motion is similar, but not equal, for all the rows. Image motion varies from being slower at the "top" and being faster at the "bottom". This image motion is compensated by using a graded FMC approach.

By way of comparison, in forward oblique operation, average FMC area imagers (oriented with their columns parallel to the Y—Y axis of FIG. 12) move charge along all columns at the same rate. Preferably, the rate is selected to be an average value of image motion and correctly compensates only at one point along the Y—Y axis.

Figure 13A:
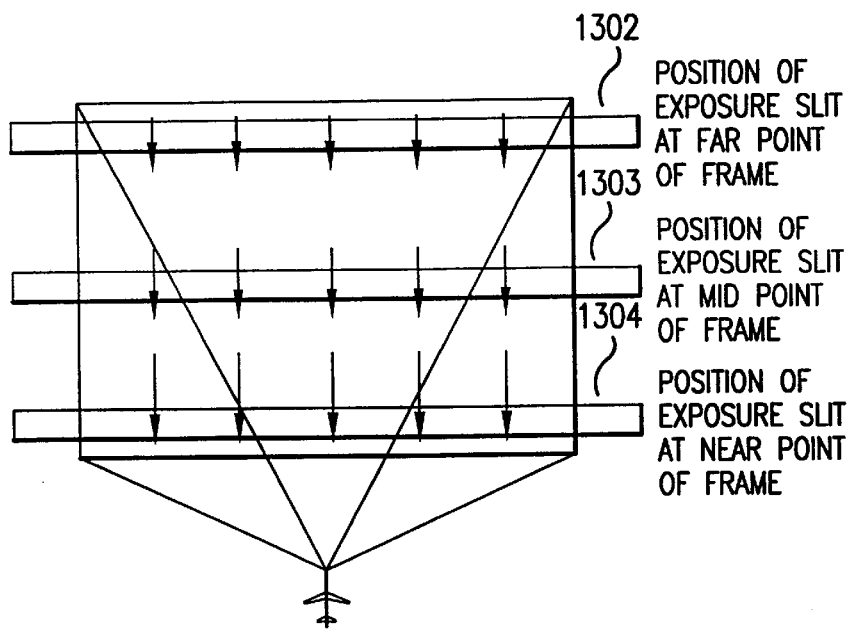
Figure 13B:
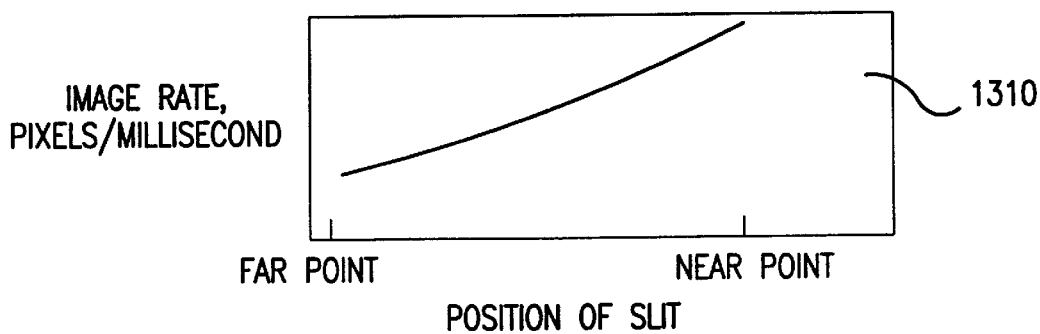
Figure 13C:
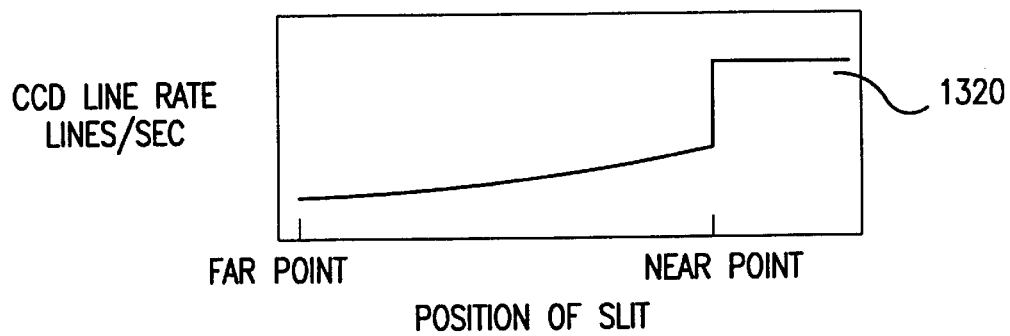

According to the present invention, graded FMC imagers (with their columns aligned parallel to the Y—Y axis) operate in the forward oblique mode in the same manner as in the side oblique case with one exception: the array (chip) is rotated 90° with respect to the direction of exposure slit travel. This method of application is illustrated in detail in FIG. 13. A focal plane shutter traverses the image area from top to bottom, and the charge motion rate is varied as a function of the position of that shutter along the Y—Y axis. For example, in FIG. 13A, position 1302 corresponds to the position of the exposure slit at the far point of the frame, position 1303 corresponds to the position of the exposure slit at the mid point of the frame, and position 1304 corresponds to the position of the exposure slit at the near point of the frame. Here, the slit is oriented perpendicular to the charge transfer columns and is moved parallel to the vector of image motion. In addition, as shown in FIG. 13B, the forward image motion rates vary as a function of V/H. As in the side oblique case described above, only the image rate at the position of the slit is "seen" by the array at any given time. The CCD line rate is made to vary as a function of slit position to match the image motion rate, as shown in FIG. 13C. At the conclusion of slit travel, the complete array is read out at a maximum rate. Thus, according to the present invention, ideal matching of image motion and charge motion can be maintained.

Column-segmented imagers can also perform image motion compensation in the forward oblique mode of operation by utilizing a moving focal plane shutter as discussed above. In particular, each column segment is clocked at the same rate because there is essentially no differential motion across the row. However, the complexities of multiple vertical clocks and potentially low yield CCD architecture are still present.

The equations describing the forward oblique in-track image motion, $V_{CCD}$, are derived in a similar manner as described above in Section 4. Referring back to FIG. 11, in this geometry:

F=Focal length
H=Altitude (ALT)
V=Aircraft velocity
$\phi$=cross track angle
$\theta$=in track angle
$\gamma$=depression angle The image transfer relationship of a lens determines the y-velocity of the image on the focal plane and is determined by:

$$y = F(\tan\theta)$$

The image motion on the focal plane as a function of the offset angle is given by:

$$\frac{dy}{d\phi} = \frac{F}{\cos^2\theta}$$

The target geometry provides the rate of change of the image Line of Sight (LOS) to target as follows:

$$\frac{d\phi}{dt} = \frac{V\sin(\gamma \pm \theta)}{\frac{H}{\sin(\gamma \pm \theta)}} = \frac{V}{H}\sin^2(\gamma \pm \theta)$$

Therefore, the velocity across the focal plane (in-track) of the image is given by:

$$V_{CCD} = \frac{dy}{dt} = \frac{dy}{d\theta} \cdot \frac{d\theta}{dt} = \frac{FV}{H} \frac{\sin^2(\gamma \pm \theta)}{\cos^2\theta}$$

For values perpendicular to the principle plane (where $\theta=0$), the effective focal length $F_{EFF}$ is given by:

$$F_{EFF} = \frac{F}{\cos\phi}$$

Therefore, the change in the position of a point y on the focal plane is given by:

$$\frac{dy}{d\theta} = \frac{F}{\cos\phi}$$

The target geometry provides:

$$\frac{d\theta}{dt} = \frac{V \cdot \sin\gamma}{\frac{H}{\sin\gamma \cdot \cos\phi}} = \frac{V}{H}\sin^2\gamma\cos\phi$$

Therefore, the velocity of the imaged point across the focal plane is $$V_{CCD} = \frac{dy}{d\theta} \cdot \frac{d\theta}{dt} = \frac{VF}{H}\sin^2\gamma$$

Note that, as the above equation shows, for the forward oblique case there is no dependence on cross-track angle $\phi$ when $\theta=0$. As in the side oblique case, these image motion equations can be used to form a look-up table that is utilized in the camera control processing system described below in Section 7(b)(i).

6. Downward Looking (Vertical) Operation in Detail

Figure 14:
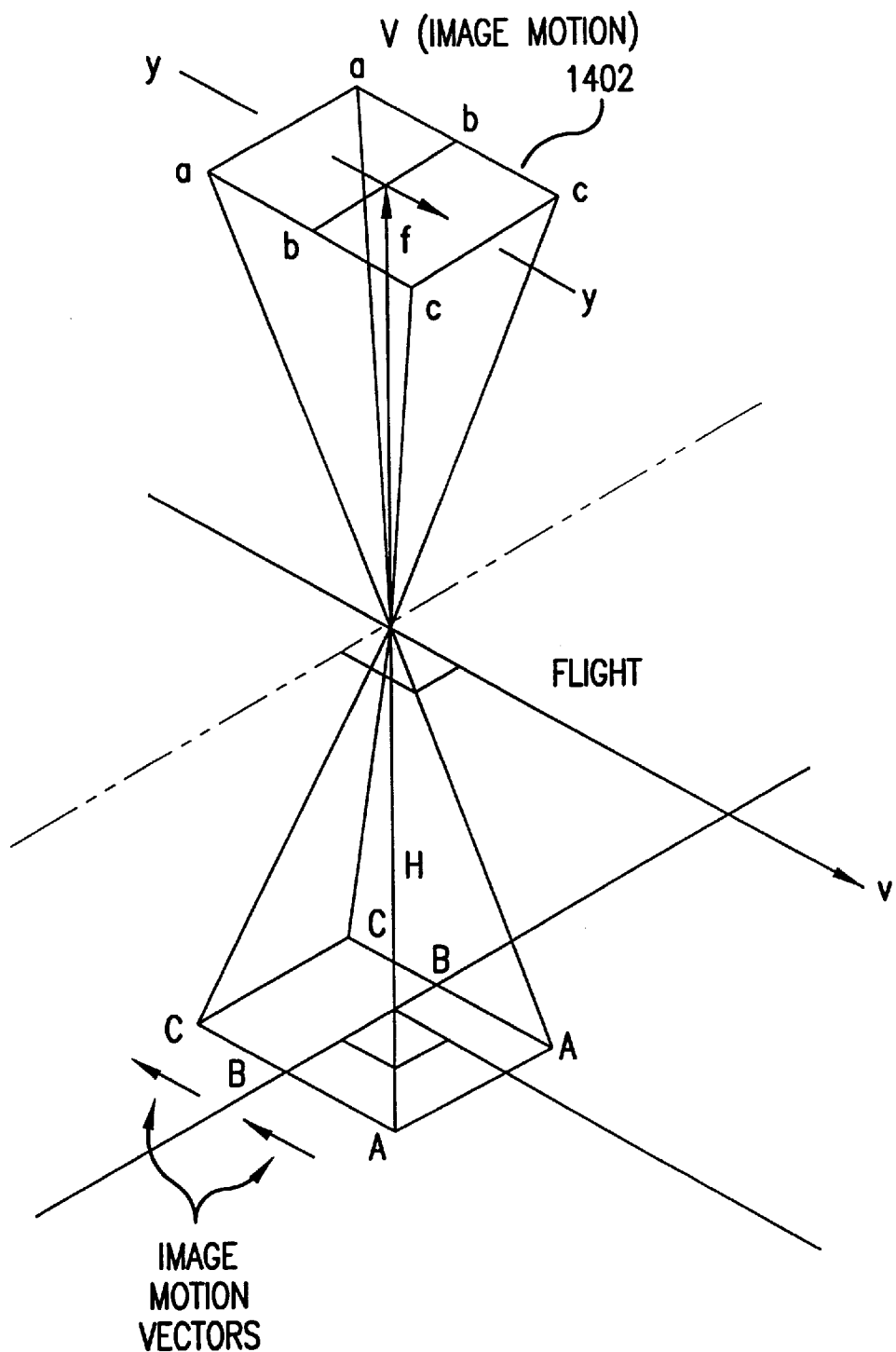
FIG. 14 is an illustration of an example environment for the electro-optical reconnaissance system operating in a vertical viewing mode.

A third method of operation for the graded FMC imager according to the present invention is in the straight downward looking (vertical) orientation. This is illustrated schematically in FIG. 14. In this mode of operation, the columns of the FPA 1402 are oriented to flow from "top to bottom" of the perceived frame of imagery. The rate of motion is the same at all points of the FOV for an undistorted lens looking perfectly vertically.

According to the present invention, graded FMC imagers, oriented with the columns parallel to the Y—Y axis, move charge along all rows at the same rate. Image motion is fully compensated since it is uniform. Neither a between-the-lens nor focal plane shutter is required to achieve FMC, although either type of shutter can be used.

Figure 15:
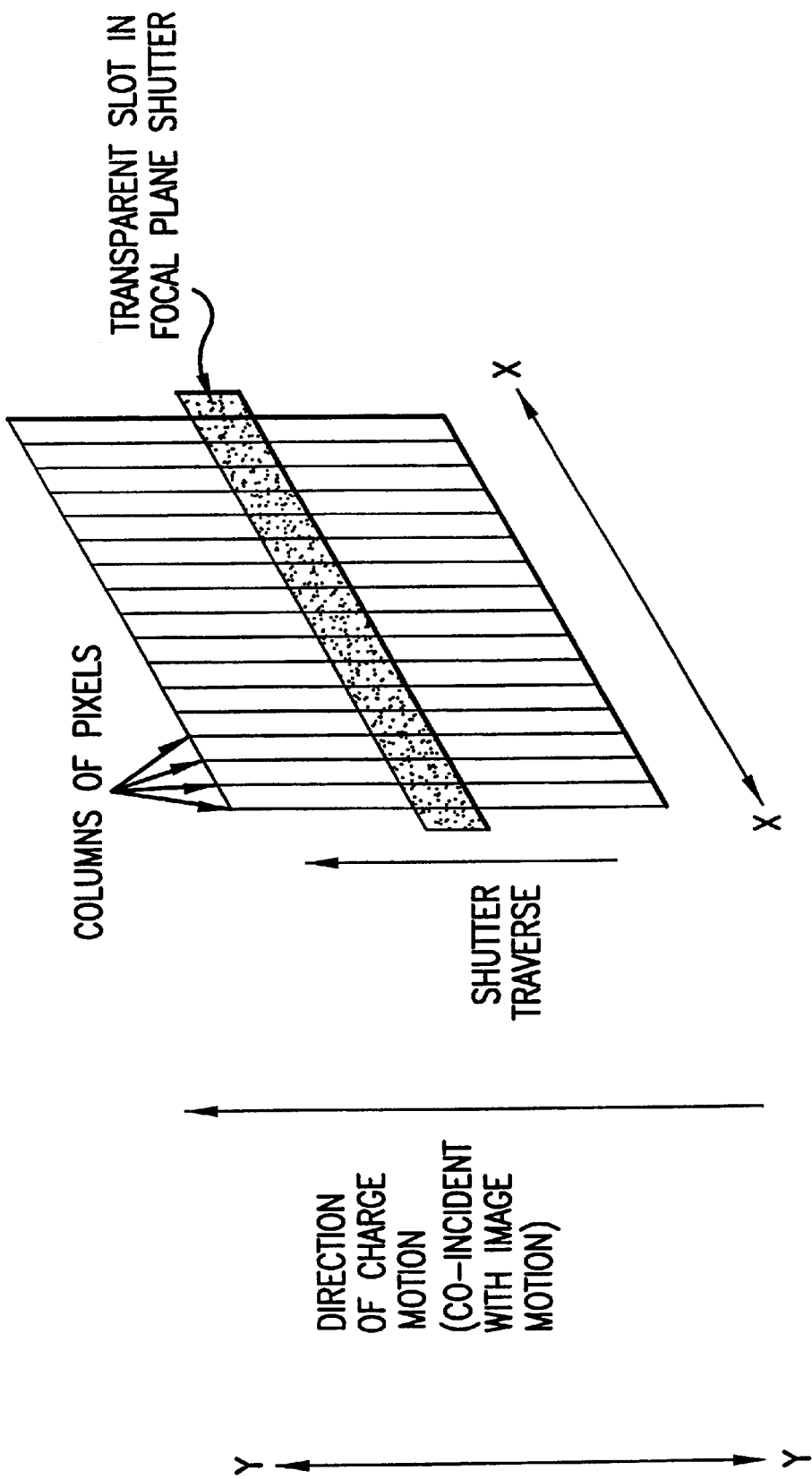
FIG. 15 illustrates the operation of a graded FMC detector array in a vertical mode according to the present invention.

The operation of a graded FMC detector array in the vertical orientation is shown schematically in FIG. 15. Since the graded FMC imager of the present invention is already equipped with a focal plane shutter for the side and front modes, that shutter can be used for the vertical mode of operation. Since image motion is uniform, the charge transfer rate remains fixed throughout the shutter scan time. The orientation of the shutter with respect to the transfer columns is optional because it is not necessary to limit exposure to a specific column as a function of image motion rate. This flexibility makes it convenient to move the camera from side oblique to downward looking without the need to rotate the chip with respect to the slit. Similarly, a camera initially oriented to operate in the forward oblique mode can be rotated down for downward looking operation without the need to re-orient the chip with respect to the slit.

In the preferred embodiment of the present invention, the focal plane shutter can be oriented such that the transparent slit traverses either side-to-side, or top-to-bottom (the orientation of which is illustrated in FIG. 15). For the vertical orientation, the magnitude of charge motion is constant with the position of the exposure slit along the Y—Y axis and is fixed for a given row along the X—X axis.

7. Preferred Embodiment of the Present Invention

The present invention can be incorporated in numerous different reconnaissance systems using current and yet-to-be-developed cameras, focal planes, and electronics systems adapted to provide a charge transfer rate that is uniform across the CCD and is time-varying in coordination with the focal plane shutter motion. The present invention is designed to utilize a variety of possible focal plane arrays, CCD imaging electronics, and system electronics to meet a specific set of desired performance specifications and parameters of the operating environment (e.g., ambient light conditions, aircraft velocity, altitude, distance to target, etc.). It will be apparent to one skilled in the art that alternative embodiments and structures may be utilized to meet these specifications and parameters. Additionally, these or alternative embodiments and/or structures may be utilized to meet alternative specifications and/or parameters.

a. Focal Plane Array

Although the invention can be utilized with numerous different focal plane array configurations, a preferred focal plane array configuration in this example operating environment is provided below. After reading this description, it will become apparent to those skilled in the art how to implement the invention using alternative focal plane arrays.

i. Focal Plane Array Size

Focal plane array size is driven by performance requirements and application parameters. Preferably, a detector array is large enough to meet the application's field of view (FOV) requirement and to achieve the desired performance (such as that defined by the National Imagery Interpretation Rating Scale (NIIRS)) from a specified altitude. For example, a high quality reconnaissance system can produce a NIIRS index of approximately 8. In this example operating environment, a General Image Quality Equation (GIQE) is used with an estimate of the Ground Sampled Distance (GSD) to produce this high NIIRS index value. For this first order analysis, it is assumed that no image enhancement is used, a system modulation transfer function (MTF) of 15% is achieved at Nyquist and the typical GIQE signal-to-noise ratio, for an f/4 optical system using a typical detector array at 20° solar altitude, is about 23:1. Applying desired light level and contrasts, this results in a GSD of about 2.4 inches to produce NIIRS 8 performance. These above mentioned standards are known to those of skill in the reconnaissance art.

In the example operational embodiment, the required cross-track field of view from a 500 foot altitude is 115°, which produces cross track coverage of 1570 feet. If this coverage is resolved uniformly, approximately 7850 pixels to sample at 2.4 inches per pixel are required to achieve NIIRS 8 throughout the field of view (FOV). To achieve a desired coverage of 1400 (2747 feet), approximately 13,737 pixels are needed to sample the FOV uniformly at NIIRS 8. In the along-track direction, the required field of view is 75° (767 feet). This coverage is sampled to NIIRS 8 with approximately 3836 pixels. Therefore, a preferred imager has between approximately 7850 and 13,737 pixels in the cross-track direction and at least 3836 pixels in the along-track direction. For example, an imager with the performance equivalent to a 100 megapixel framing camera ±20% requires between approximately 9000 by 9000 pixels and 11,000 by 11,000 pixels, or another appropriate multiple. Thus a large scale, monolithic CCD is the preferred focal plane array according to the present invention.

Alternatively, the present invention can also utilize a step-stare imager, which is known in the relevant art. The line of sight of the imager can be repositioned by either moving the lens assembly or by moving a mirror/prism in front of the lens. However step-stare approaches introduce an added level of mechanical complexity to a reconnaissance system. In addition, increased coverage can be achieved by mechanically butting two arrays together, eliminating the problems associated with step-staring. However, the added cost of matching four chips, processing complexity, and the loss at the critical central region due to butting creates an undesirable tradeoff for a framing camera.

The focal plane arrays described above are provided for example only. The above example illustrates the manner in which the array size is chosen for a particular set of performance specifications and application criteria. For other applications or performance specifications, alternative focal plane array sizes can be implemented as would be apparent to one of ordinary skill in the art.

ii. Array Architecture

Eliminating complexity in the device design and processing is essential to obtaining a sufficient yield to make an imager economically viable. The preferred array architecture for the rows in the main format area is the conventional three-phase structure, which is known to be straightforward to process with high yields. The column structure depends on the type of on-chip forward motion compensation (FMC). The preferred embodiment of the present invention utilizes a graded (i.e., non-segmented) FPA for use in a system based on the graded FMC approach described above.

Figure 16:
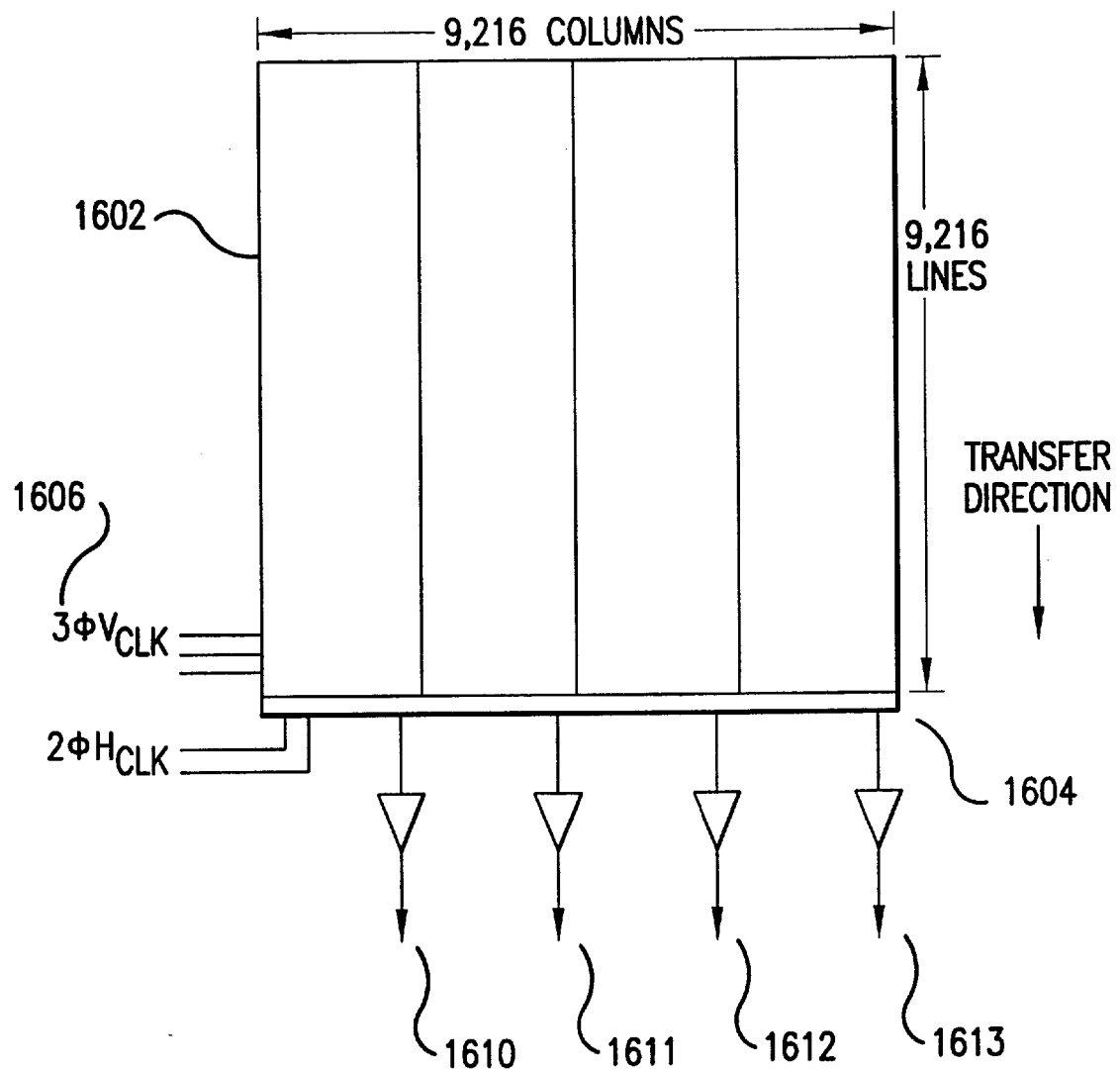
FIG. 16 illustrates a layout of a focal plane array according to the present invention.

The functional layout for a 9216 pixel by 9216 pixel device according to one embodiment is shown in FIG. 16. According to a preferred embodiment of the present invention, the full-frame CCD imager has an 8.1 centimeter (cm) by 8.1 cm main format area 1602 containing an array of 9216×9216 pixels. Each pixel size is approximately 8.75 micrometers ($\mu$m)×8.75 $\mu$m. The serial register 1604 at the bottom of main format 1602 has four detector/amplifier outputs 1610–1613. The sampling rate for each output is approximately 25 megapixels/second. A greater or lesser number of amplifier outputs can be utilized depending on the readout requirements.

Figure 17:
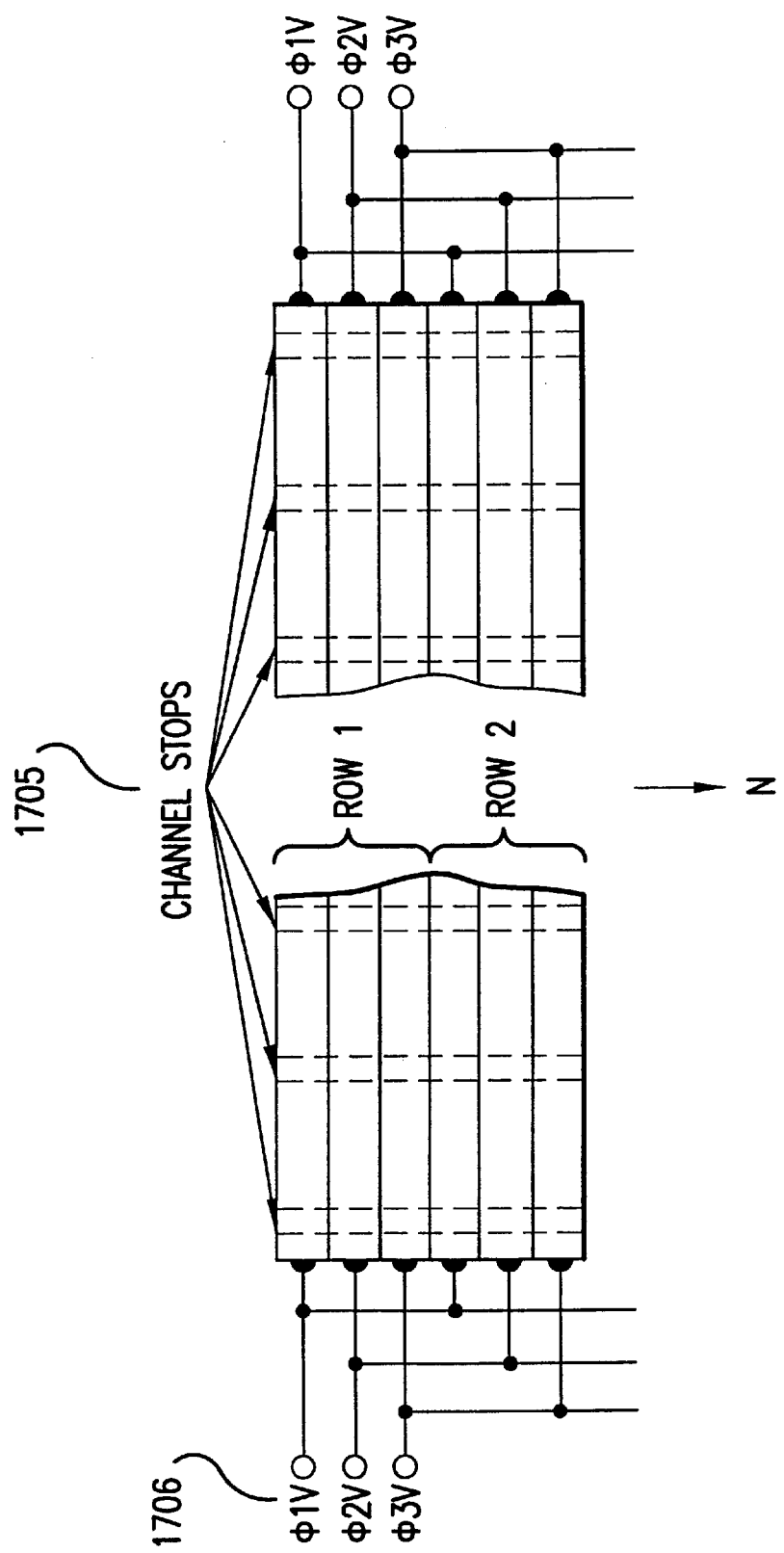
FIG. 17 illustrates a preferred embodiment of the focal plane array with side bus connections.

As described above in connection with FIG. 3 and the description of conventional CCD operation in section 3, during the integration or exposure period, an electronic representation of an image is formed when incident photons create free electrons that are collected within the individual photosites. These photoelectrons are collected locally by the bias action of the three "V" electrodes 1606 and the column boundaries formed by the P+ channel-stop implants. These column boundaries are illustrated as channel stops 1705 in FIG. 17. FIG. 17 also illustrates that in a preferred embodiment, poly V-phase gates 1706 with side bus connections are utilized.

After an integration time, a shutter (such as a focal plane shutter or a between the lens shutter described above) closes to block illumination on the focal plane and the readout cycle begins. During readout, the complete image is shifted out by changing the potentials on electrodes $V_1$, $V_2$, and $V_3$ in a sequence which causes packets of signal charge to move line by line into the horizontal output register.

Referring back to FIG. 16, during each line readout time period, the voltage on the electrodes comprising the horizontal shift registers are changed or "clocked" to shift pixel charges into the output detector and amplifier structure (1610–1613). One-by-one the charge packets are dumped on a small conductive area called the floating diffusion (FD). There the charge packets change the FD potential by an amount equal to nq/C, where n is the number of electrons/packet, q is the electron charge in coulombs and C is the FD capacitance. The FD voltage is sensed and buffered to the signal output by an on-chip FET source follower structure located within a detector/amplifier, such as amplifier 1610.

When FMC is required, the normally static bias condition for the "V" electrode voltages are modified to cause charge packets to transfer at a rate corresponding to the rate of image motion normal to the line direction of the array matrix. The FMC charge shift is always in the same direction. The rate of charge shift can vary as the slit opening in the focal plane shutter moves from top to bottom of the CCD format. The FMC line shifts that occur during the exposure period are small in number compared to the total lines of the CCD format.

In one embodiment, an approach to multiport operation is to separate only the horizontal output register 1604 into segments, where each segment contains an output detector/amplifier structure. A unique feature of this output register design is a taper region between the last active format line and throughput register. This eliminates any gap between columns of the active format.

Figure 18A:
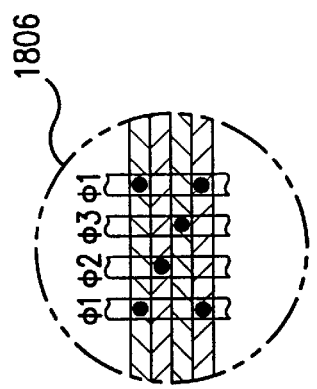
FIGS. 18A and 18B are exploded views taken from FIG. 28.
Figure 18B:
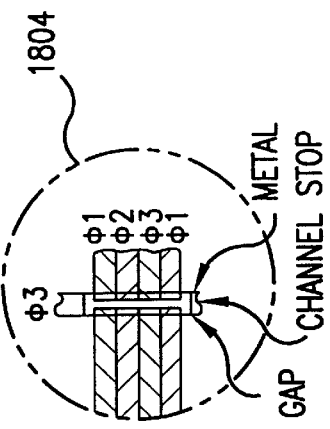
Figure 18:
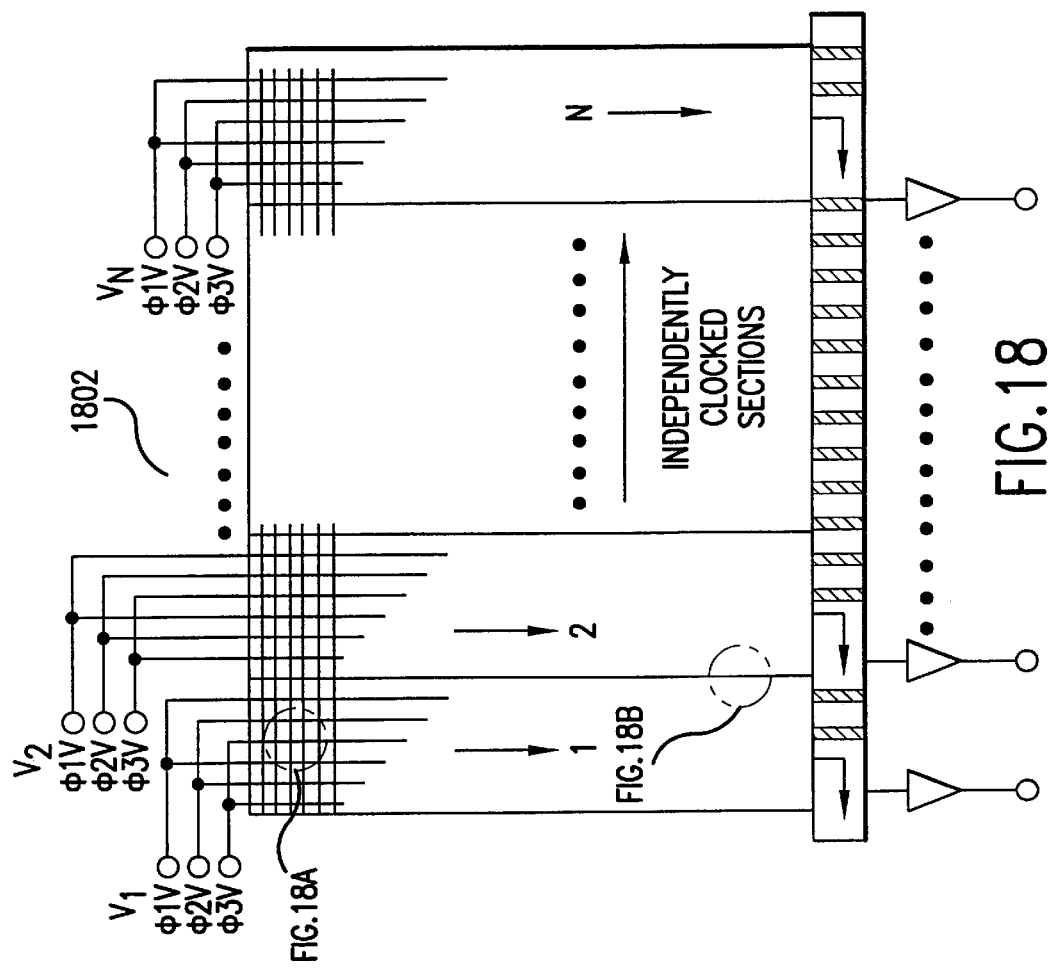
FIGS. 18 and 19 illustrate the clocking sections of a detector array with a column-segmented imaging area according to an alternative embodiment of the present invention.

Alternatively, a column-segmented CCD, having as many as 16 segments can be utilized in order to achieve sufficient FMC to produce good quality images. For example, FIG. 18 depicts the architecture of a column-segmented CCD array 1802 having N column segments. If the number N of column segments is 16, these 16 column segments thus require an increase in the number of separate variable V clocks from 3 to 48, with an associated increase of the off-chip drive electronics. Additionally, as shown in insert 1804 of FIG. 18B, a column-segmented design requires metalization in the imaging area which significantly reduces CCD yield. Moreover, a column-segmented CCD requires an increased number of contact holes (the locations where the metal makes contact to the underlying structures), as shown in insert 1806 of FIG. 18A. As discussed below, this added complexity is required in order to vertically clock the column-segmented focal plane array.

iii. Vertical Clocking

Figure 19:
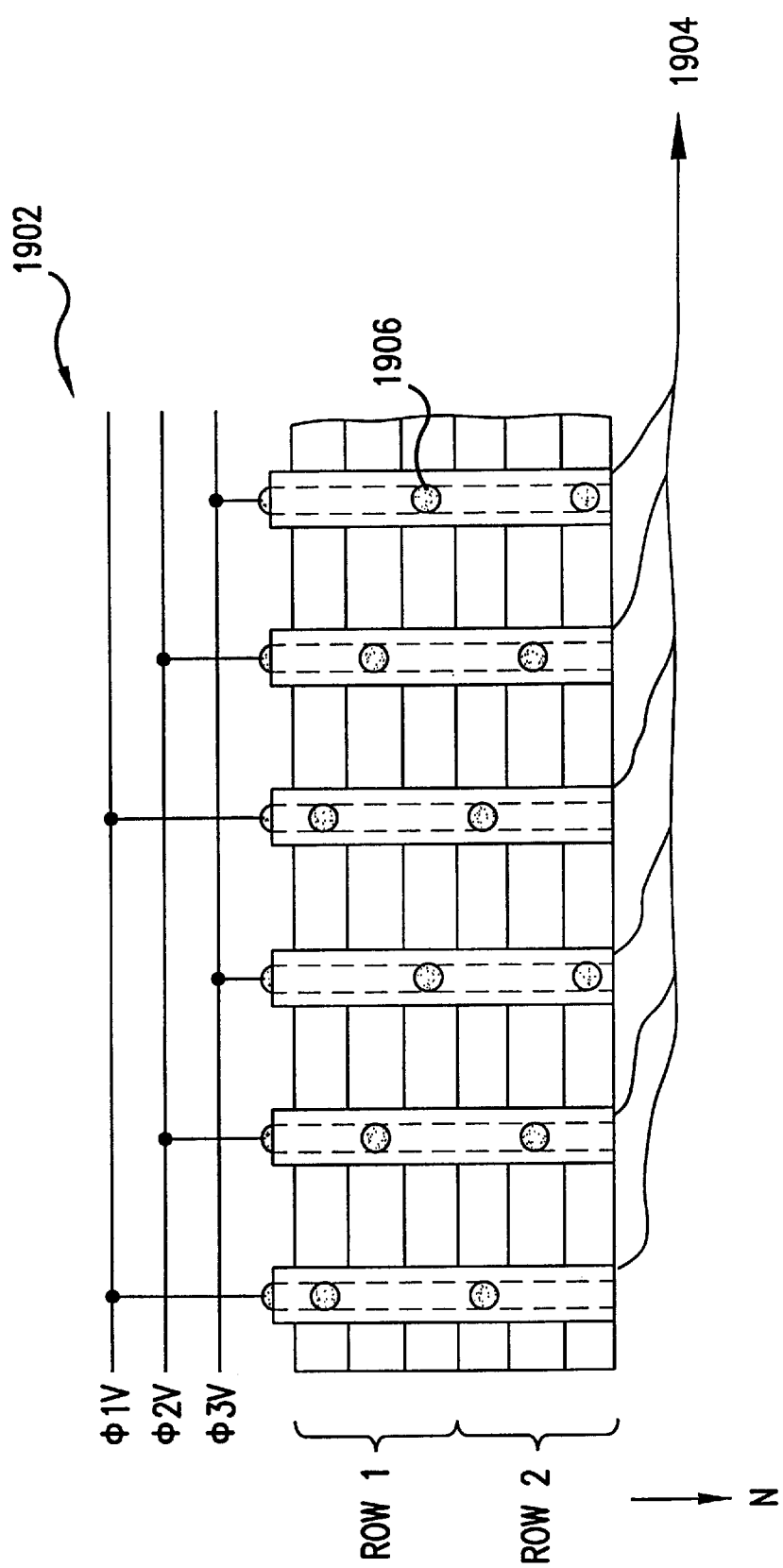

FIG. 19 further illustrates a portion of a column-segmented CCD shown above in insert 1806 of FIG. 18. Note that array 1902 includes metal straps 1904 over the corresponding channel stops with thru-hole metal-poly contacts, such as contact hole 1906. For very large area arrays, side bussed polysilicon gate lines as illustrated in FIG. 17 are much easier to process with high yields than the more complex metal strapped structure shown in FIG. 19. Metal strapping, which is usually done to achieve very fast V clocking, is a required feature for column-segmented arrays.

The yield limitations of metal strapping arise from the need to make small diameter openings in the insulating dielectric coatings such that the metal straps make contact with each of the polysilicon gate lines (see e.g., contact hole 1906). As shown in FIG. 19, for a three phase CCD, every row of N pixels contains N/3 contact regions (one every third pixel). In small pixel devices (<12 $\mu$m$^2$) with ½ to 1 $\mu$m overlap of the phase gates, there is very little room in each of the three gates to etch down and contact the first poly layer. This is further aggravated by alignment inaccuracies between $\phi_1$, $\phi_2$, $\phi_3$ and the contact layer.

The contact problems are exacerbated when the array image section is segmented, such as in array 1802 from FIG. 18. To minimize loss of information, the gap between segments must be kept small: yet the metal over the channel stop must be kept from causing an electrical short between adjacent segments of the same phase.

As mentioned above, a graded FMC imager having a side bussed polysilicon gate structure without metal strapping or format segmentation, such as the array structure illustrated in FIG. 17, is preferred for full-frame imager production. According to a preferred embodiment of the present invention, for the 9216 by 9216 array (totaling approximately 85 megapixels) operating at an output of 100 megapixels per second, the full format can be read out in 85/100 or 0.85 seconds. The corresponding line shift time is 0.85/9216 or 92.2 microseconds ($\mu s$), which is the maximum time allowed for clocking each line to the output serial register.

Figure 20:
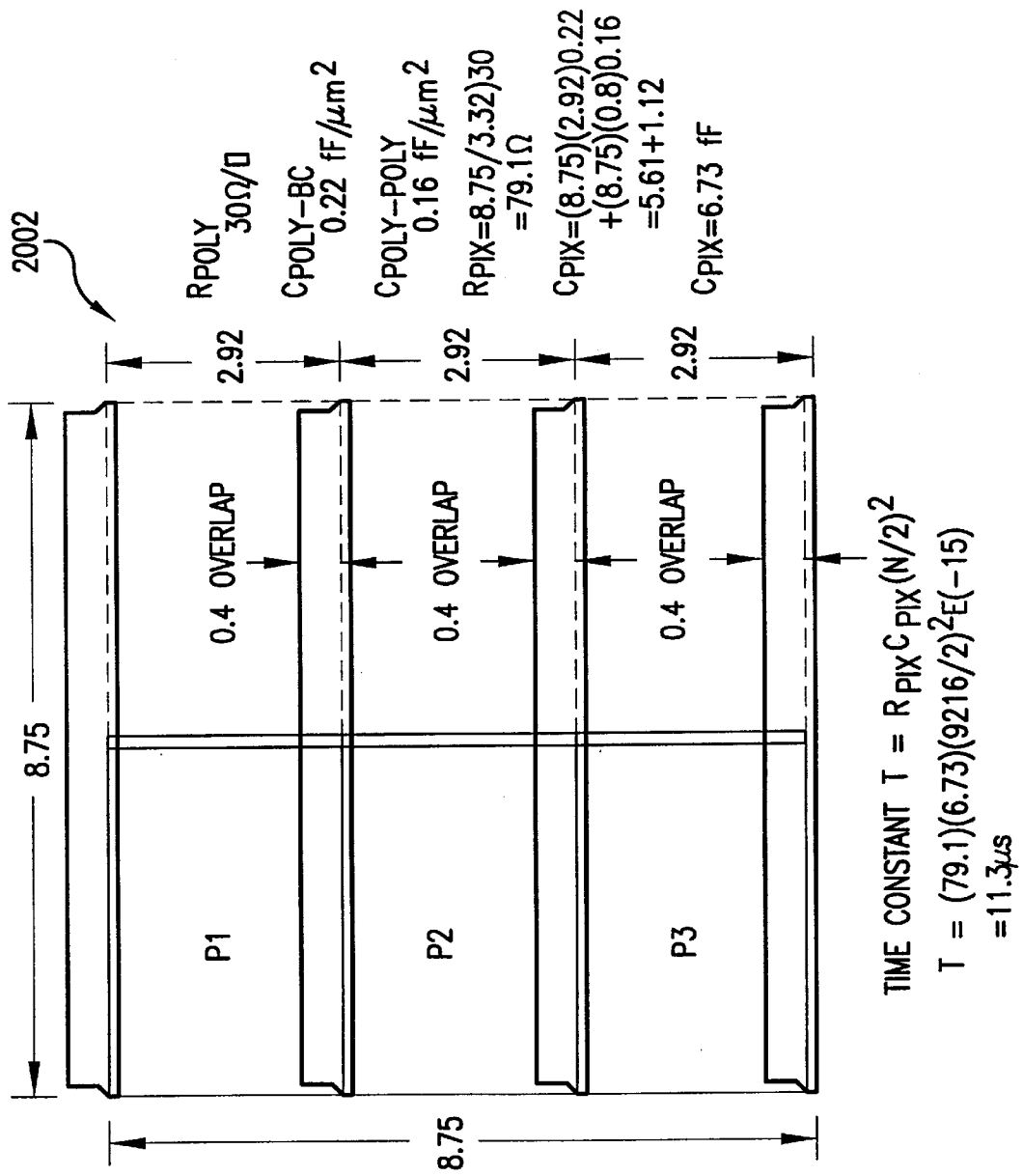
FIG. 20 illustrates a pixel model for determining a time constant for V-phase gates according to the present invention.

Burst clocking, as is the case for TV cameras where the line is only shifted during horizontal blanking, can require even shorter shift time. Although some feedthrough of clock into the video does occur, this signal contamination is line coherent and readily removed with a digital stored compensating signal. FIG. 20 shows a model used to determine the vertical poly line time constant for the preferred 9216 pixel×9216 pixel CCD. A time constant (T) value of 11.3 microseconds ($\mu s$) is calculated based on the pixel resistance (Rpix) and pixel capacitance (Cpix) values listed on the right hand side of model 2002. This T value fully supports clocking with a preferred 92.2 $\mu s$ line time interval.

iv. CCD Imager

Characteristics for the CCD imager in a preferred embodiment of the present invention are listed below in Table 1. Other CCD's with other characteristics can be used as would be apparent to those of skill in the art.

TABLE 1

FULL-FRAME IMAGE SENSOR SPECIFICATIONS

| | |
|---|---|
| Active Pixels per line | 9216 |
| Active lines (progressive readout) | 9216 |
| Pixel size, $\mu m$ | 8.75 × 8.75 |
| Image format, mm | 80.64 × 80.64 |
| Number of output registers | 4 (on one side) |
| Number of outputs | 4 |
| Data rate | 100 MHz |
| Resolution: MTF at Nyquist | 50% |
| Q Saturation (100% pixels) | 70 k electrons |
| RMS noise electrons | 18 |
| Dynamic range | 72 dB |
| Pixel random nonuniformity | 3% |
| Dark current (20° C., 1 second) | <480 electrons |
| Fixed pattern noise (20° C., 1 second) | <75 electrons |
| QE, | |
| 550 nm | 29% |
| 650 nm | 44% |
| 750 nm | 35% |
| 850 nm | 20% |
| Number of clocks (vertical) | 3 |
| Number of overscan columns | 1/segment |
| Number of black reference columns | 2 × 20 (20 L × 20 R) |
| Number of black reference lines | 20 (bottom) |
| Clock amplitude (vertical) | 10 V |
| Total number of lines | 9236 |
| Number of clocks (horizontal) | 2 |
| Clock amplitude (horizontal) | 10 V |
| Conversion factor, $\mu V$/electron | 3 |
| Linearity | 99% |
| Pixel rate per output | 25 MHz | b. System Electronics

Figure 21:
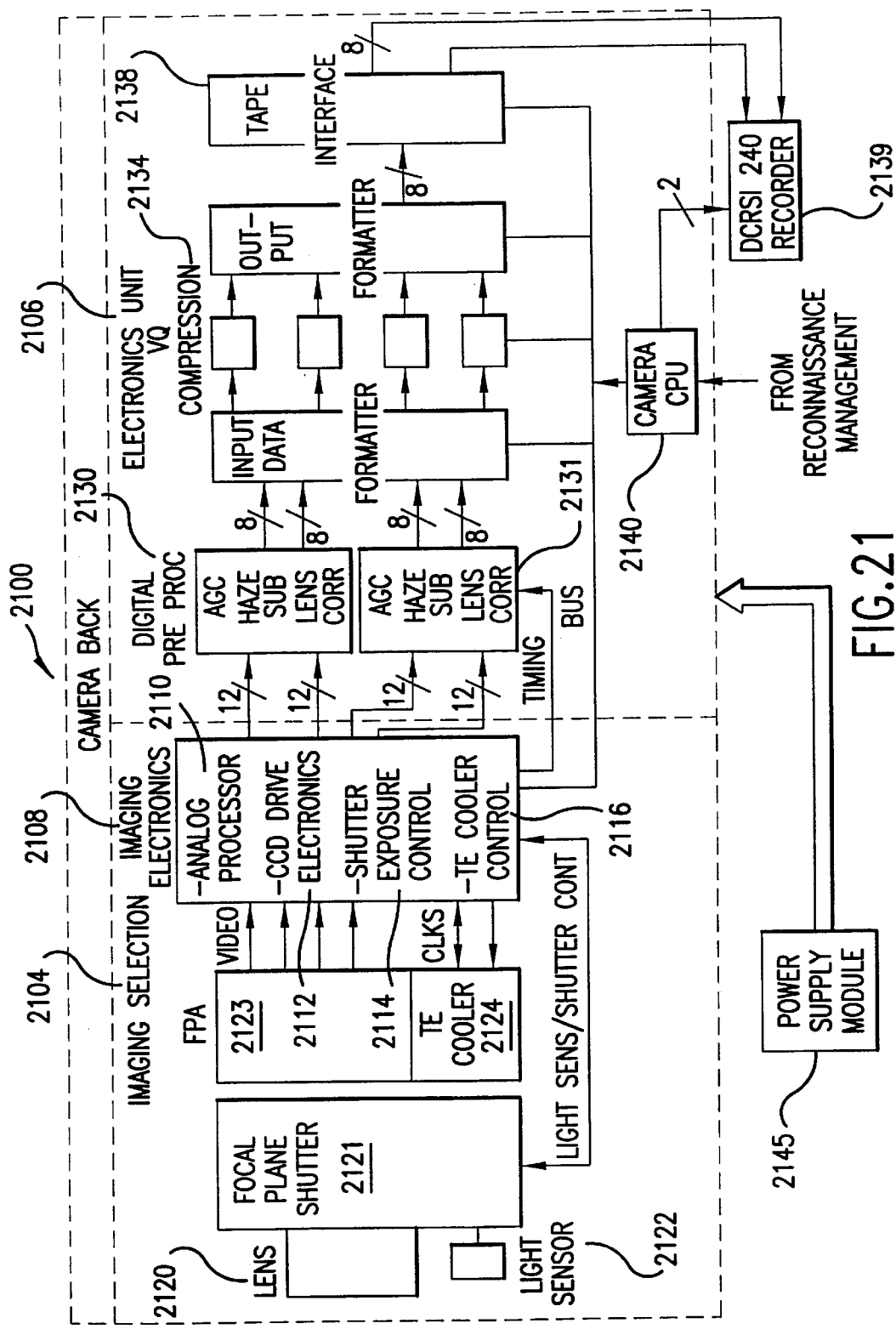
FIG. 21 is a block diagram of the electro-optical reconnaissance system's camera electronics according to a preferred embodiment of the present invention.

A block diagram of an example system electronics architecture is illustrated in FIG. 21. In this example architecture, the camera back electronics 2100 comprise an imaging section 2104 and an electronics unit 2106. According to this example architecture, the imaging section 2104 includes imaging electronics 2108 comprising an analog processor 2110, thermo-electric (TE) cooler controller 2116, shutter exposure control 2114 and the FPA (or CCD) drive electronics 2112. These electronics are used to command and communicate with the focal plane array 2123, in conjunction with the FMC methods discussed above. As described above, a lens 2120 collects the target image onto FPA 2123. A focal plane shutter 2121 traverses across FPA 2123 at a rate corresponding to image motion of the objects viewed in the scene. The rate at which shutter 2121 traverses FPA 2123, as well as the slit width of shutter 2121 are determined based on the commands of imaging electronics 2108. The TE cooler controller 2116 controls a TE cooler 2114, which maintains the operating temperature of FPA 2123. The camera control electronics also include a power supply module 2145.

The camera back electronics 2100 also include an electronics unit 2106 to ultimately process the image of the target scene as viewed by FPA 2123. The electronics unit 2106 includes the camera host processor (or CPU) 2140, two digital preprocessors 2130 and 2131, the data compression electronics 2134, the tape recorder interface 2138, and a DCRSI 240 recorder 2139. The digital preprocessors 2130 and 2131 utilize ASIC technology. In addition, the camera CPU 2140 controls the CCD clock speed and its variation to implement FMC. The functionality of these individual components is discussed below in detail. Except where noted below, these electronics can be conventional electronics that are known in the art. Alternative architectures can be implemented to perform these functions, as would be apparent to one of skill in the art.

i. Camera Control Process

The electronics illustrated in FIG. 21 are used to perform FMC according to the present invention. An exemplary FMC method utilizing these electronics, and based on the image motion equations described above in sections 4 and 5 is shown in FIG. 22.

Figure 22:
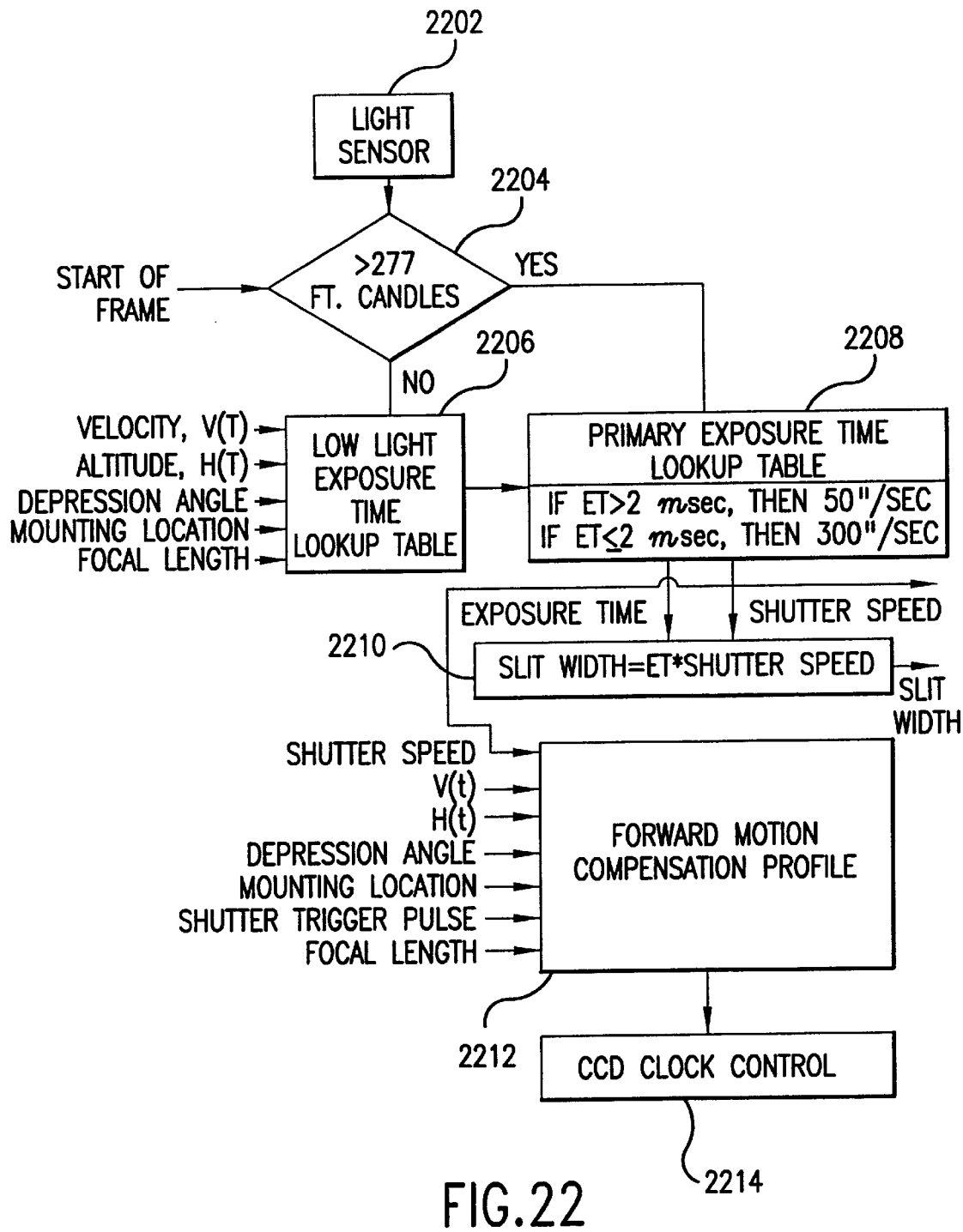
FIG. 22 is a flow chart of the camera motion compensation control process according to the present invention.

FIG. 22 is a flow diagram that describes the camera control process according to one embodiment. The control of light level involves decision points and simple look-up tables in steps 2206 and 2208. Referring to both FIGS. 21 and 22, the process starts at the start of a frame at step 2202, where the input light level to the camera is measured by a light sensor, such as light sensor 2122. This light level is compared to a standard light level at step 2204. For example, the chosen standard light level is 277 foot candles, which corresponds to a solar altitude of approximately 3° above the horizon. At high solar altitudes (>277 foot candles), the decision is made to use the Primary Exposure Time Look-up Table to determine exposure time (step 2208). For longer exposure times (>2 milliseconds (ms)) required for low ambient lighting conditions, the shutter speed is slowed down to approximately 50 inches/second in order to keep the slit width narrow enough for graded FMC. For short exposure times ($\leq 2$ ms), a shutter speed of approximately 300 inches/second is selected.

For the lowest ambient light conditions, an exposure time is determined from the Low Light Exposure Time Look-up Table (step 2206). This table utilizes the instantaneous values of aircraft velocity, altitude, and camera look angle at the start of each frame in addition to the light level. One example of when the low light exposure time look-up table is used is when the measured light level is <277 foot candles, such as when the solar altitude is less than 3°. Other thresholds can be defined for the lowest ambient light condition based on mission requirements.

The output of the exposure time look-up steps 2206 or 2208 is the optimal exposure time and selection of a shutter speed. The corresponding slit width is determined in step 2210, where the slit width chosen is a product of the exposure time and the shutter speed. Correspondingly, the exposure time can be determined by dividing the slit width by the shutter speed.

Once exposure time is determined, for each frame, the CCD clocking profile is calculated in step 2212 to accomplish FMC. In one embodiment, this profile is determined by the host processor 2140 (in step 2212). In step 2212 a look-up table based on the in-track image motion rate equations described above in sections 4 and 5 (depending on the oblique mode of operation) is used with the following inputs: exposure time; aircraft velocity, V; aircraft altitude, H; depression angle of camera (fixed for flight); camera installation location (fixed for flight); shutter trigger pulse; and focal length. In a preferred embodiment, the process is re-initiated at the start of each camera frame. The resulting FMC clocking signal is sent to imaging electronics 2108 to perform FMC (step 2214).

ii. CCD Drive Electronics

The CCD drive electronics (such as CCD drive electronics 2112 from FIG. 21) comprise two essential parts, a timing generator, and a clock drive stage. These elements are shown in detail in FIG. 23, which represents an exemplary design to perform optimum CCD and system clocking. The timing generator is responsible for two functions, CCD readout and Forward Motion Compensation (FMC).

Figure 23:
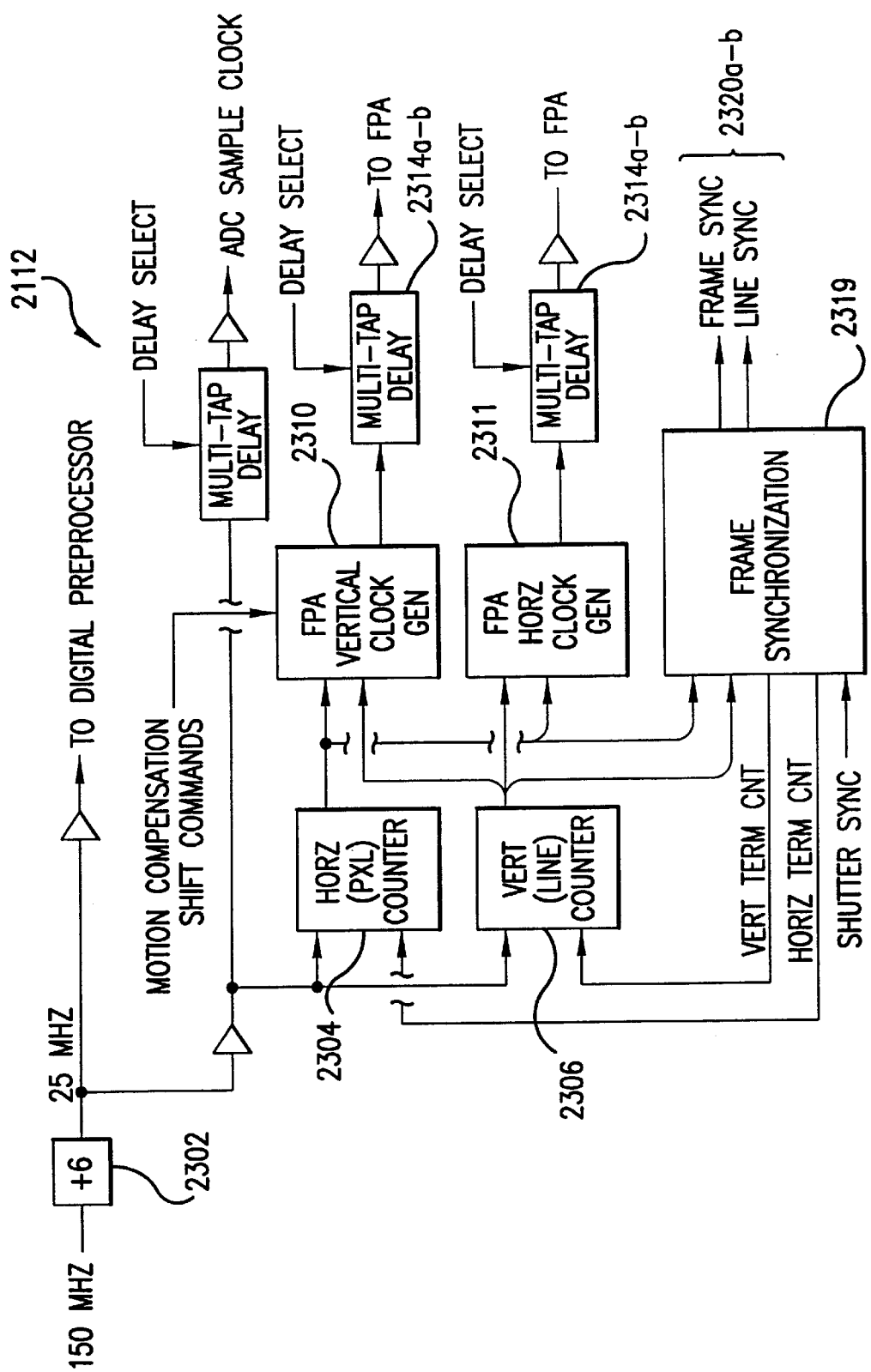
FIG. 23 is a block diagram of the timing generator and CCD drive electronics implemented in the reconnaissance system according to the present invention.

As shown in FIG. 23, a 150 MHz master clock signal is divided by six (at location 2302) to provide the local 25 MHz pixel clock, from which all CCD clocks and digital controls are derived. The horizontal counter 2304 provides a time base for pixel counting operations, which include defining the vertical shift interval at FPA vertical clock generator 2310 and clocking of the horizontal output CCD registers at FPA horizontal clock generator 2311. The vertical counter 2306 likewise provides a time base in the vertical direction of the CCD. Alternatively, higher frequency clocks may also be utilized to provide for greater smoothness of steps to the vertical clocks.

Multi-tap delay lines 2314a–b are employed on the horizontal and vertical clocks to permit minute refinements in phase relationships, allowing optimization of vertical and horizontal charge transfer efficiency.

Additionally, the 25 MHz clock is buffered and skew-compensated to provide synchronous timing to both the video sampling analog-to-digital converters (ADC) and the subsequent digital preprocessing.

Synchronization signals are generated at frame synchronization unit 2319, in the form of frame and line syncs 2320a–b, respectively. These sync signals synchronize the digital preprocessors 2130 and 2131 (in FIG. 21) to the quantized video stream.

Figure 24:
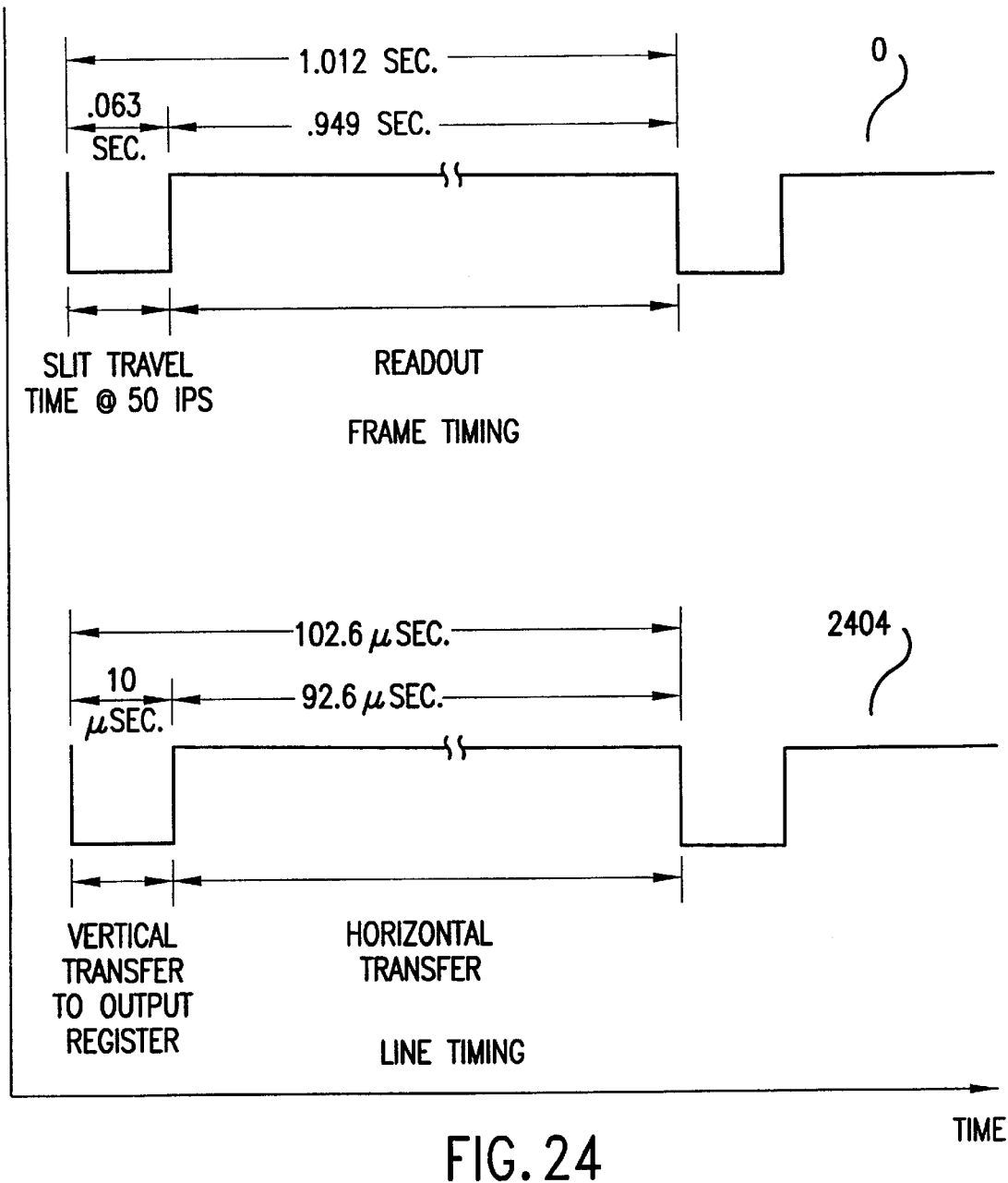
FIG. 24 illustrates example frame timing and line timing signals according to the present invention.
Figure 25:
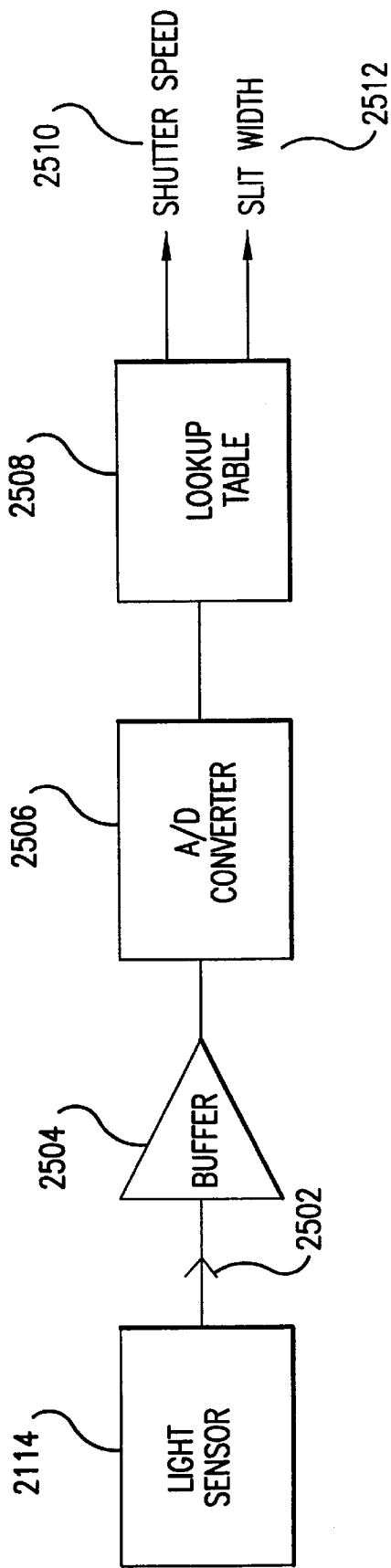
FIG. 25 is a block diagram of the shutter exposure control according to the present invention.

FIG. 24 represents example line and frame timing output pulses 2404 and 2402, respectively. For the example operating conditions described above, the line and frame timing are derived as follows:

Line Timing 9216 pixels/line÷4 segments=2304 pixels per segment 2304 active pixels+10 pre/post scan=2314 pixels/line 2314 pixels÷25 MHz+10 µs (vertical clock interval)= 102.6 µs/line=9747 lines/second Frame Timing 9216 active lines+20 pre/post scan=9236 lines/frame Readout time=9236×102.6 µs=0.9472 second Maximum exposure time (at 50 ips)=0.0638 second Frame time=0.9472+0.0638=1.011 second/frame=0.989 frames/second.

iii. Forward Motion Compensation (FMC)

As explained above in section 3, during the CCD exposure interval, the charge pattern formed in the CCD corresponding to the optical image is shifted at the rate the image is moving in order to compensate for the effect of the aircraft's forward motion. This charge pattern movement is accomplished by applying variable clock rate vertical transfer signals to the CCD during the exposure time. Referring back to FIG. 21, these signals are generated in the clock waveform generators of CCD drive electronics 2112, and are controlled in both frequency and duration by CPU 2140. The V/H signal is interpreted by the host processor 2140 to provide rate-based CCD vertical shift commands (seen in FIG. 22, CCD clock control 2214) to a timing generator (explained in detail above), in turn commanding the CCD to shift for motion compensation. FMC occurs during the integration time of the CCD. At this time, all CCD clocks are in an inactive state until commanded by the processor to perform a vertical shift for FMC.

The vertical clock drivers move the charge through the integration sites, and into the horizontal output register (see FIG. 16). According to a preferred embodiment, the vertical clock drivers 2310 supply a 10 volt peak-to-peak drive waveform into 4 nano-fared (nf) gate capacity. A typical CCD readout rate according to the present invention is approximately 9747 Hz. However, during FMC, the vertical transfer can go as high as 12 KHz. For example, in a preferred embodiment, a known MIC4451 driver (manufactured by MICREL Semiconductor, Inc., of San Jose, Calif.) can be used as the vertical driver 2310. Other known drivers can also be utilized based upon cost and performance considerations.

The horizontal clock drivers 2311 move the charge through the horizontal register to the floating diffusion (FD) section (of amplifiers 1610–1613 in FIG. 16) where the output voltage signal is formed. These horizontal drivers supply up to a 10 volt peak-to-peak waveform into 125 pico-fared (pf) at the 25 MHz pixel rate. A discrete component circuit known in the art can be utilized as no satisfactory monolithic circuit drivers are currently available. The horizontal and vertical drivers each have adjustable offset and gain capabilities, to permit tuning to optimal performance for each individual array.

iv. Shutter Exposure Control

In a preferred embodiment, CCD exposure is controlled by two focal plane functions: the width of the focal plane shutter exposure slit and the speed of the exposure slit (e.g., shutter 2121 illustrated in FIG. 21). In alternative embodiments, exposure can be controlled by either function alone. As mentioned above, in a preferred embodiment, the width of the slit is approximately 0.1 inch to 0.5 inches, and the speed of the exposure slit is approximately 300 inches per second for shorter exposure times and 50 inches per second for longer exposure times. Thus, the speed of the exposure slit can be constant across the FPA or varied, depending upon the necessary forward motion compensation required.

In the illustrated embodiment, the existing light sensor output (such as from light sensor 2122 in FIG. 21) is digitized by the shutter exposure control circuitry 2114. An example exposure control block diagram is shown in FIG.

Figure 26:
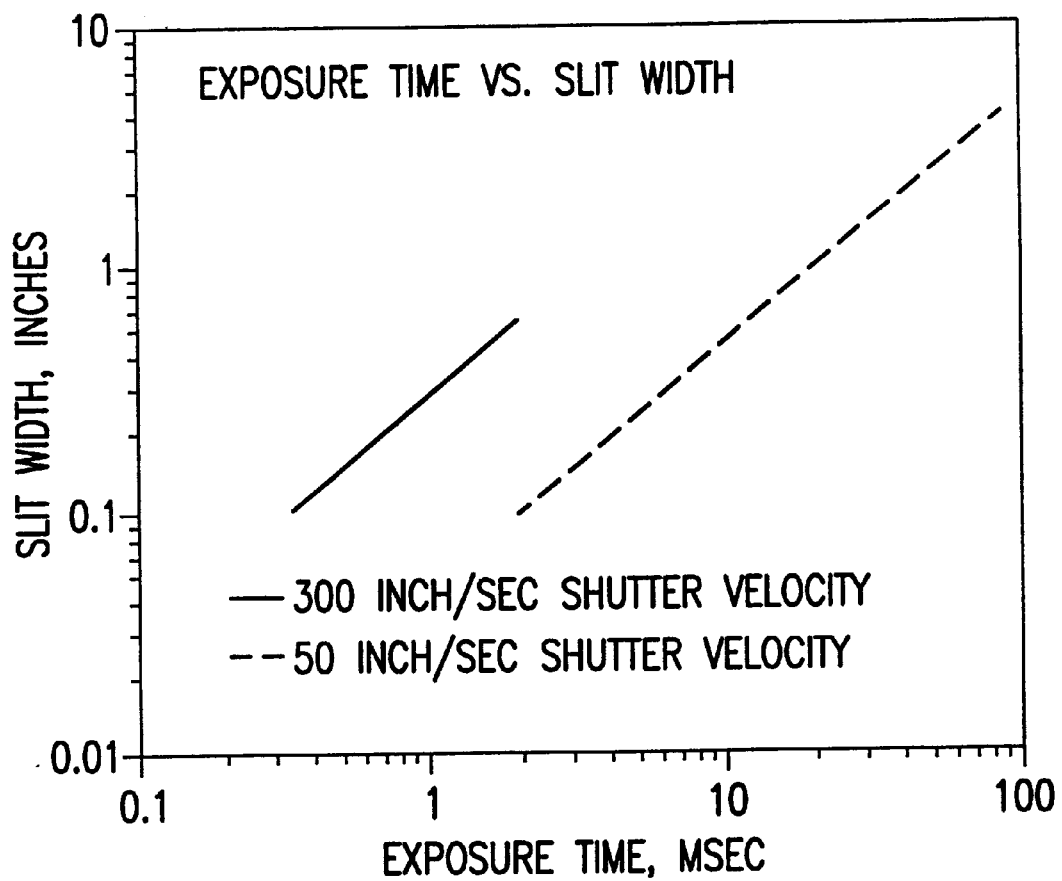
FIG. 26 plots exposure time versus slit width for two example shutter speeds according to the present invention.
Figure 27:
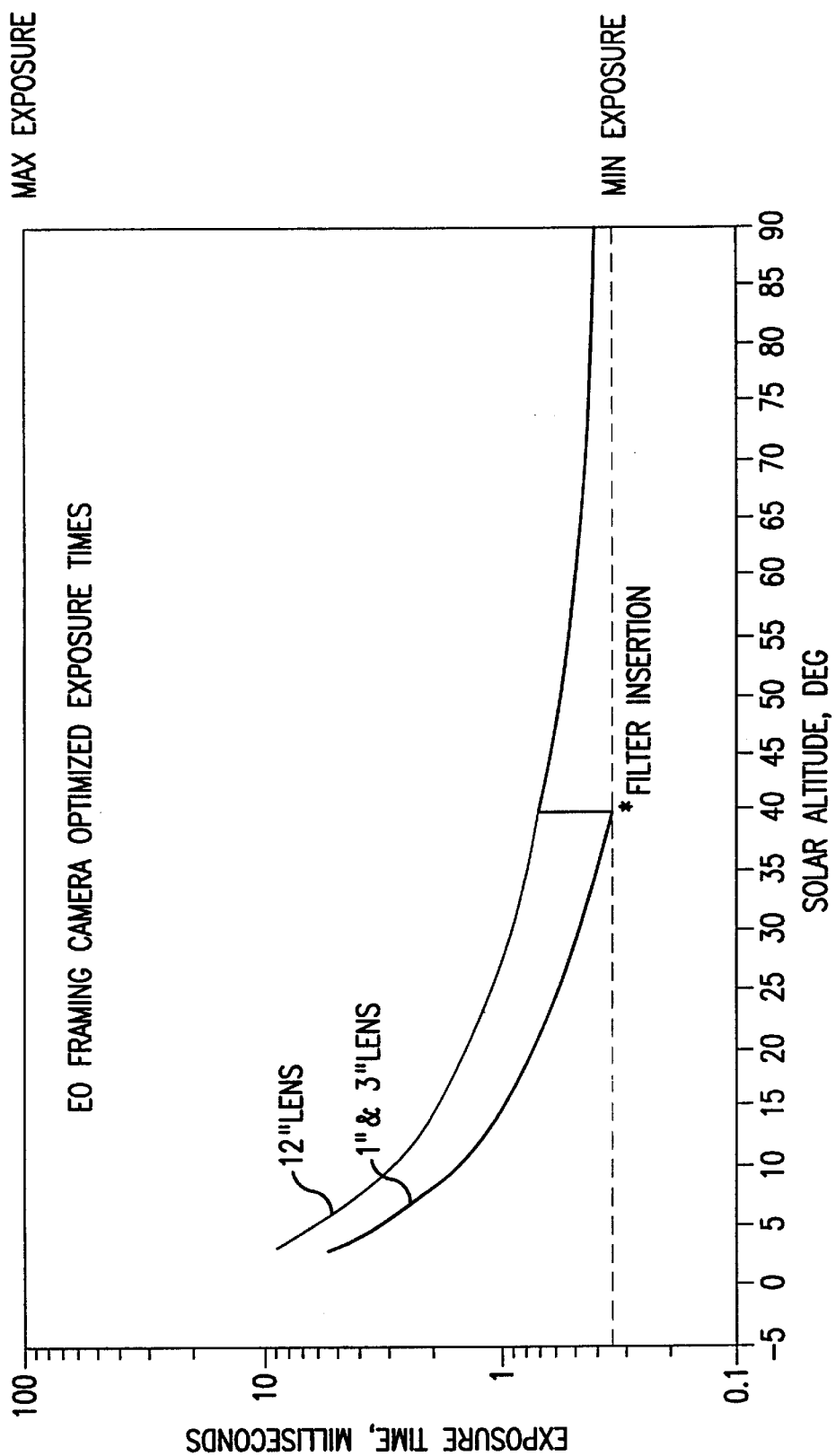
FIG. 27 plots exposure time as a function of solar altitude for various lenses according to the present invention.

25. The light sensor signal 2502 is converted to look-up table values located in look-up table 2508 after buffering (at buffer 2504) and digitization (at ADC 2506) to separately drive the speed 2510 and slit width 2512 of the shutter. An example exposure control profile is shown in FIG. 26, where exposure time is plotted as a function of slit width. An example plot of optimized exposure times for the CCD, in standard daylight conditions, is a function of the sun angle as represented in FIG. 27. It should be noted that illumination levels change dramatically at dawn and dusk conditions. Also, the step indicated by an asterisk (*) in FIG. 27 is due to a filter inserted in front of the imager.

As described above in connection with FIG. 22, the CCD's exposure time (t), which is the time it takes the slit to pass any single pixel, is given by:

$$t = w/s$$

where w=slit width in inches, and s=shutter speed in inches/second. In a preferred implementation, the exposure time is set by the incident light. Because the final signal amplitude is controlled by an automatic gain control (AGC) function in the digital preprocessing sections 2130 and 2131, this open loop control function, which mimics that used on the film camera, represents the preferred approach.

For example, for light levels down to 3° solar altitude (i.e., the 277 foot candles level), the exposure time follow the curves shown in FIG. 27. Below these light levels (essentially at dusk), the length of exposure is limited by the calculated image motion variations across the chip. Camera focal length, V/H and depression angle are used to select proper look-up table exposures at the very low light levels as previously shown in FIG. 22, step 2206.

v. Digital Preprocessor

Figure 28:
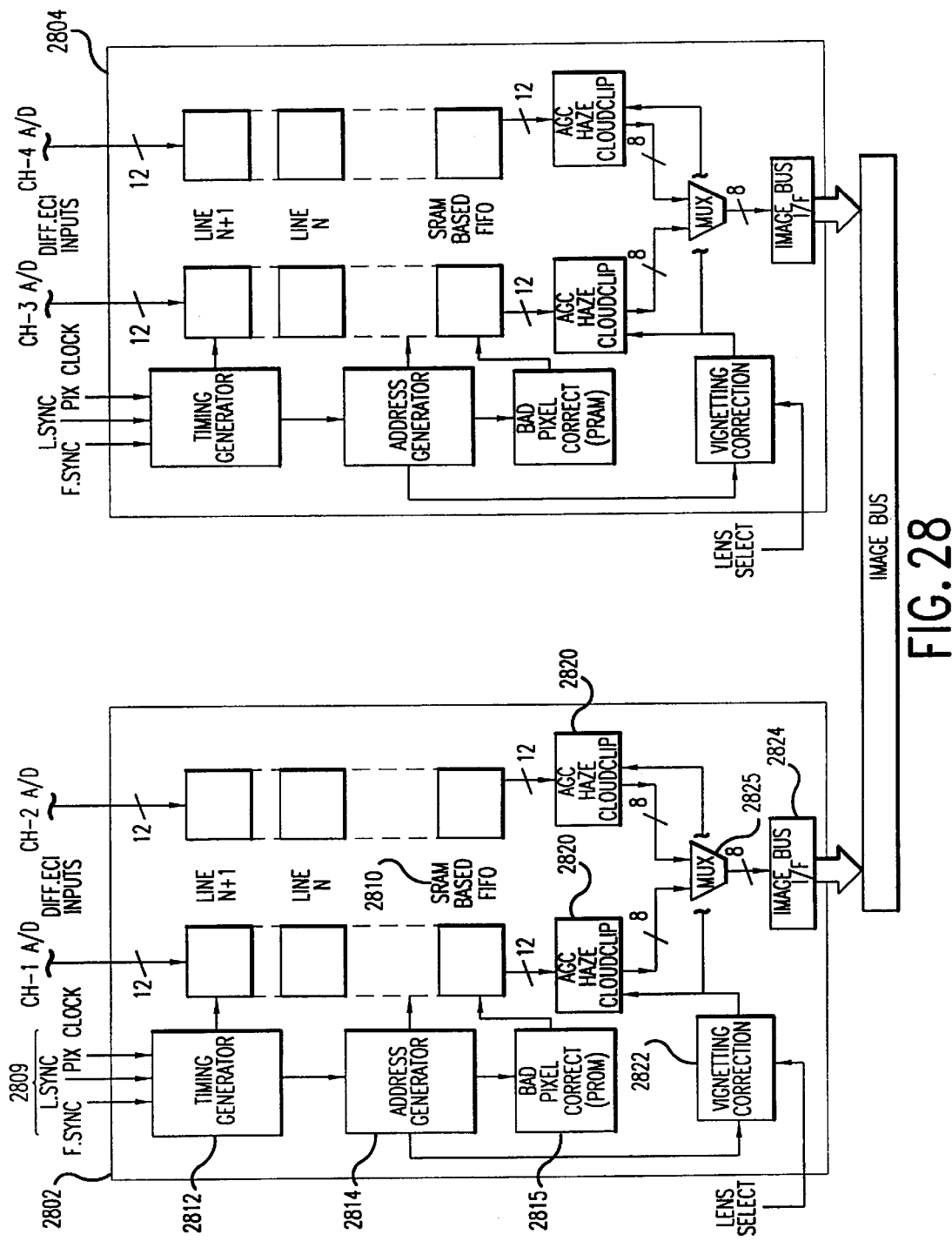
FIG. 28 is a block diagram of the digital preprocessor according to a preferred embodiment of the present invention.

In a preferred embodiment, as shown in detail in FIG. 28, digital preprocessing is performed on two identical Circuit Card Assemblies (CCAs) 2802 and 2804. CCA 2802 processes inputs from channels 1 and 2, and CCA 2804 processes inputs from channels 3 and 4. These CCAs respectively correspond to digital preprocessors 2130 and 2311, illustrated in block diagram form in FIG. 21.

Because CCA 2802 and CCA 2804 are similar, only the elements comprising CCA 2802 are described. In one embodiment, CCD pixel data is stored in high speed Static Random Access Memory (SRAM) configured as First In/First Out (FIFO) memory (see location 2810). This FIFO memory operates as line buffers to facilitate replacing defective pixels with nearest neighbor processing. Defective pixels are identified during laboratory testing and characterization of the CCD. Locations of these defective pixels are stored as (X,Y) coordinates in Programmable Read Only Memories (PROM) 2815 on the digital preprocessor board. These locations are compared to the (X,Y) coordinates of the FPA as it is read out. When a match occurs, the defective pixel is replaced by a known nearest neighbor processing routine. This implementation reduces the hardware complexity required for defective pixel correction for the 9216 pixel×9216 pixel FPA.

In a preferred embodiment, memory addressing is generated by a Field Programmable Gate Array (FPGA) based timing and address generator 2814, which runs synchronously and in tandem with the CCD timing generator 2812 on the EO module CCA 2802. CCD timing generator 2812, which is synchronized by the frame and line sync 2809, uses the 25 MHz video sampling clock. This synchronous operation eliminates any possibility of injecting uncorrelated noise into the video.

The memories 2815 are read out into the Application Specific Integrated Circuit (ASIC) 2820. The 12-bit video data at full scale is equivalent to saturation of the CCD. For most operational scenarios, the video sensor signal occupies only a fraction of an ADC's 12-bit dynamic range. Specular reflections, manifest as high intensity transients, are subtracted out with a digital low pass filter within ASIC 2820. Haze, which manifests itself as a DC level (i.e., no counts in the lower bins of the gray scale histogram), is also subtracted out at ASIC 2820. The Automatic Gain Control (AGC) functionality in ASIC 2820 detect the maximum and minimum amplitude of the signals, maintaining a running average over multiple lines. The AGC gain is then adjusted to take full advantage of the 8-bit dynamic range. This 12 to 8-bit conversion eliminates the non-essential video information while preserving the actual imagery data. Further, the 8-bit data is in the proper format for the image bus control ASIC 2824 and the data compressor 2825. The AGC action optimizes sensor performance and reduces the raw data rate by 30% without degradation of the original image.

Illumination (vignetting) correction is performed at chip 2822 by applying correction coefficients (e.g., for the 1", 3" and 12" lenses) to the gain input of AGC ASIC 2820. During factory calibration, curves of the illumination roll-off across the FPA are established. The inverse of these curves is programmed into Programmable Read Only Memory (PROM) 2815, which provides these gain corrections to the video.

As noted, the electronic components described above can be conventional electronics that are known in the art. Alternative architectures can be implemented to perform the aforementioned functions, as would be apparent to one of skill in the art.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An electro-optical reconnaissance system, comprising:

a focal plane array including a main format area having a plurality of photo-sensitive cells arranged in rows and columns, wherein said focal plane array is configured to detect a projected image of a scene and to convert said image into an electronic charge representation of said image;

a shutter having a controllable exposure slit proximate to said focal plane array, wherein said exposure slit is moved across said focal plane array to define areas of exposure having approximately equal image motions and wherein said charges representing said image are transferred at a charge transfer rate corresponding to said image motion in said area of said scene exposed by said shutter exposure slit; and a camera control electronics unit driving said plurality of photo-sensitive cells with a clocking signal for an exposed portion of said focal plane array corresponding to said charge transfer rate, wherein said clocking signal corresponds to a position of said exposure slit and said image motion;

wherein the reconnaissance system is installed in a vehicle capable of moving in a forward direction, and wherein said camera control electronics unit comprises:

an imaging electronics section comprising
an analog processor to process said transferred electronic charges representing said image,
focal plane array (FPA) control electronics to generate said clocking signal to drive said FPA, and
a shutter exposure control unit to control shutter parameters, wherein said shutter parameters include said exposure slit width and said speed of said exposure slit;
a signal processing electronics unit comprising
a digital preprocessor coupled to said FPA drive electronics and to said analog processor, to receive and further process said electronic charge representation of said image, and to provide a digital processed image signal, and
a camera central processing unit (CPU), to process mission parameter inputs and provide processed mission parameter information to said imaging section to perform forward motion compensation (FMC) of said image;
wherein said FPA control electronics comprise:
a timing generator to generate a master timing signal and to provide for focal plane array readout and FMC, wherein said master timing signal is divided by a predetermined value to provide a local timing signal;
a horizontal counter to provide a time base for pixel counting operations;
a vertical counter to provide a time base in the vertical direction of said focal plane array;
a horizontal clock generator coupled to said horizontal and vertical counters, to provide a vertical clocking signal to said focal plane array;
a vertical clock generator coupled to said horizontal and vertical counters, to provide a vertical clocking signal to said focal plane array;
a frame synchronization unit, coupled to said horizontal and vertical counters, to generate frame sync signals and line sync signals; and
a plurality of multi-tap delay lines to define a phase relationship of said horizontal and vertical clocking signals.

2. The electro-optical reconnaissance system, comprising:
a focal plane array including a main format area having a plurality of photo-sensitive cells arranged in rows and columns, wherein said focal plane array is configured to detect a projected image of a scene and to convert said image into an electronic charge representation of said image;
a shutter having a controllable exposure slit proximate to said focal plane array, wherein said exposure slit is moved across said focal plane array to define areas of exposure having approximately equal motions, and wherein said charges representing said image are transferred at a charge transfer rate corresponding to said image motion in said area of said scene exposed by said shutter exposure slit;
a camera control electronics unit driving said plurality of photo-sensitive cells with a clocking signal for an exposed portion of said focal plane array corresponding to said charge transfer rate, wherein said clocking signal corresponds to a position of said exposure slit and said image motion;
wherein the reconnaissance system is installed in a vehicle capable of moving in a forward direction, wherein said camera control electronics unit comprises:
an imaging electronics section comprising
an analog processor to process said transferred electronic charges representing said image,
focal plane array (FPA) control electronics to generate said clocking signal to drive said FPA, and
a shutter exposure control unit to control shutter parameters, wherein said shutter parameters include said exposure slit width and said speed of said exposure slit;
a signal processing electronics unit comprising
a digital preprocessor coupled to said FPA drive electronics and to said analog processor, to receive and further process said electronic charge representation of said image, and to provide a digital processed image signal; and
a camera central processing unit (CPU), to process mission parameters inputs and provide processed mission parameter information to said imaging section to perform forward motion compensation (FMC) of said image;
wherein said FPA control electronics comprise:
a timing generator to generate a master timing signal and to provide for focal plane array readout and FMC, wherein said master timing signal is divided by a predetermined value to provide a local timing signal;
a horizontal counter to provide a time base for pixel counting operations;
a vertical counter to provide a time base in the vertical direction of said focal plane array;
a horizontal clock generator coupled to said horizontal and vertical counters, to provide a horizontal image clocking signal to said focal plane array;
a vertical clock generator coupled to said horizontal and vertical counters, to provide a vertical clocking signal to said focal plane array;
a frame synchronization unit, coupled to said horizontal and vertical counters, to generate frame sync and line sync signals; and
wherein said digital preprocessor comprises:
a circuit card assembly (CCA) to process inputs from said imaging electronics section.

3. The electro-optical reconnaissance system of claim 2, wherein said CCA comprises:
a Static Random Access Memory (SRAM) configured as First In/First Out (FIFO) memory to store pixel data from said focal plane array, wherein said FIFO memory facilitates replacing defective pixels with nearest neighbor processing;
a timing generator coupled to said frame sync and line sync signals;
a Field Programmable Gate Array (FPGA) address generator coupled to said timing generator to generate memory addressing;
a Programmable Read Only Memory (PROM) coupled to said FPGA address generator to store locations of said defective pixels;
an Automatic Gain Control (AGC) ASIC to reduce said pixel data without degradation of the original image, wherein said pixel data is reduced from twelve-bit form to eight-bit form;
an illumination chip to correct for vignetting effects of said image; and
an image bus coupled to said AGC ASIC to receive said eight-bit data format.

4. The electro-optical reconnaissance system of claim 3, wherein said AGC ASIC includes means to subtract out specular reflections contained on said image, subtract out haze contributions contained on said image, and maintain a running average of said image data.

* * * * *

UNITED STATES PATENT AND TRADEMARK OFFICE
CERTIFICATE OF CORRECTION

PATENT NO. : 6,373,522 B2
DATED : April 16, 2002
INVENTOR(S) : Bruce A. Mathews et al.

It is certified that error appears in the above-identified patent and that said Letters Patent is hereby corrected as shown below:

Column 23,
Line 30, please replace "vertical" (second occurrence) with -- horizontal --;
Line 41, please replace "The" with -- An --;
Line 51, please replace "equal motions" with -- equal image motions --;
Line 55, please insert -- and -- after "slit;";
Line 64, please insert -- and -- before "wherein";

Column 24,
Line 13, please replace "parameters" with -- parameter --; and
Line 28, please delete "image".

Signed and Sealed this

Twenty-ninth Day of October, 2002

Attest:

Attesting Officer

JAMES E. ROGAN
Director of the United States Patent and Trademark Office